United States Patent
Ramasubramonian et al.

(10) Patent No.: US 9,596,486 B2
(45) Date of Patent: Mar. 14, 2017

(54) IRAP ACCESS UNITS AND BITSTREAM SWITCHING AND SPLICING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Krishnakanth Rapaka, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 14/244,743

(22) Filed: Apr. 3, 2014

(65) Prior Publication Data

US 2014/0301485 A1 Oct. 9, 2014

Related U.S. Application Data

(60) Provisional application No. 61/809,063, filed on Apr. 5, 2013, provisional application No. 61/812,225, filed on Apr. 15, 2013.

(51) Int. Cl.
*H04N 19/103* (2014.01)
*H04N 19/895* (2014.01)
*H04N 21/2343* (2011.01)
*H04N 21/845* (2011.01)
*H04N 21/438* (2011.01)

(52) U.S. Cl.
CPC ... *H04N 19/895* (2014.11); *H04N 21/234327* (2013.01); *H04N 21/8451* (2013.01); *H04N 21/8455* (2013.01); *H04N 21/4384* (2013.01)

(58) Field of Classification Search
CPC ......... H04N 19/895; H04N 21/234327; H04N 21/4384; H04N 21/8451; H04N 21/8455
See application file for complete search history.

(56) References Cited

U.S. PATENT DOCUMENTS

2009/0116558 A1   5/2009   Chen et al.
2010/0232520 A1   9/2010   Wu et al.
(Continued)

FOREIGN PATENT DOCUMENTS

EP   2304955 A1   4/2011

OTHER PUBLICATIONS

Wang,Enhancement-layer IDR (EIDR) picture, 17. JVT Meeting; 74. MPEG Meeting;Oct. 14, 2005.*

(Continued)

*Primary Examiner* — Dave Czekaj
*Assistant Examiner* — Md Haque
(74) *Attorney, Agent, or Firm* — Shumaker & Sieffert, P.A.

(57) ABSTRACT

In one example, a device for coding video data includes a video coder configured to code an intra random access point (IRAP) picture of a partially aligned IRAP access unit of video data, and code data that indicates, when performing random access from the partially aligned IRAP access unit, at least one picture of a video coding layer that is not correctly decodable. When the video coder comprises a video decoder, the video decoder may skip decoding of the pictures that are not correctly decodable, assuming random access has been performed starting from the partially aligned IRAP access unit.

41 Claims, 8 Drawing Sheets

(56) References Cited

U.S. PATENT DOCUMENTS

| | | | |
|---|---|---|---|
| 2011/0081133 A1* | 4/2011 | Chen | G11B 27/005 386/356 |
| 2011/0134994 A1* | 6/2011 | Lu | H04N 21/23424 375/240.02 |
| 2013/0272430 A1* | 10/2013 | Sullivan | H04N 19/70 375/240.26 |
| 2014/0050264 A1 | 2/2014 | He et al. | |
| 2014/0085415 A1 | 3/2014 | Bici et al. | |
| 2014/0301437 A1 | 10/2014 | Wang | |
| 2014/0355692 A1 | 12/2014 | Ramasubramonian et al. | |

OTHER PUBLICATIONS

Wang, et al., "AHG9: On cross-layer alignments in HEVC 3DV and scalable extensions," Joint Collaborative Team on Video Coding (JCT-VC) of ITU-T SG 16 WP 3 and ISO/IEC JTC 1/SC 29/WG 11, Document: JCTVC-M0266_v2, Apr. 18-26, 2013, 6 pp.

Tech, et al., "MV-HEVC Draft Text 3 (ISO/IEC 23008-2:201x/PDAM2)," Joint Collaborative Team on Video Coding (JCT-VC) of ITU-T SG 16 WP 3 and ISO/IEC JTC 1/SC 29/WG 11, Document: JCT3V-C1004_d3, Jan. 17-23, 2013, 39 pp.

Wang, et al., "AHG9: On cross-layer alignments in HEVC 3DV and scalable extensions," Joint Collaborative Team on Video Coding (JCT-VC) of ITU-T SG 16 WP 3 and ISO/IEC JCT 1/SC 29/WG 11, Apr. 21, 2013; 13th Meeting: Incheon, KR, JCTVC-M0266_v2, Apr. 18-26, 2013, 6 pp.

Tech, et al., "MV-HEVC Draft Text 4," Joint Collaborative Team on Video Coding (JCT-VC) of ITU-T SG 16 WP 3 and ISO/IEC JCT 1/SC 29/WG 11, No. JCT3V-D1004_d0, version 1, Apr. 20-26, 2013; 4th Meeting; May 13, 2013; 53 pp.

Wang, et al., "AHG9: On cross-layer alignments in HEVC 3DV and scalable extensions," Joint Collaborative Team on Video Coding (JCT-VC) of ITU-T SG 16 WP 3 and ISO/IEC JCT 1/SC 29/WG 11; No. JCTVC-M0266_v2, Apr. 18-26, 2013; 13th Meeting; Apr. 21, 2013; 6 pp.

Boyce et al., "Joint BoG report on extension high-level syntax", JCT-3V Meeting; MPEG Meeting; Jan. 17-23, 2013; Genevea; (The Joint Collaborative Team on 3D Video Coding Extension Development of ISO/IEC JTC1/SC29/WG11 and ITU-T SG.16); URL:http://phenix.int-evry.fr/jct2/, No. JCT3V-C0235, XP030130651, 5 pp.

Bross, et al., High Efficiency Video Coding (HEVC) text specification draft 10 (for FDIS & Last Call), JCTVC-L1003 v32 11, Joint Collaborative Team on Video Coding (JCT-VC) of ITU-T SG 16 WP 3 and ISO/IEC JTC 1/SC 29/WG 11 12th Meeting, vol. JCTVC-L1003 v32, revised Mar. 16, 2013, XP055140558, 325 pp.

Bross, et al., "High Efficiency Video Coding (HEVC) text Specification draft 10 (for FDIS & Consent)," JCT-VC Meeting; MPEG Meeting; Jan. 17-23, 2013; Geneva; (Joint Collaborative Team on Video Coding of ISO/IEC JTC1/SC29/WG11 and ITU-T SG.16); Retrieved from the Internet , No. JCTVC-L1003, XP030113948, 321 pp.

Chen, et al., "High efficiency video coding (HEVC) scalable extensions Draft 5", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1008-v4, XP030115882, 125 pp.

Chen et al., "SHVC Working Draft 1", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L1008, XP030113953, 33 pp.

Chen et al., "MV-HEVC/SHVC HLS: On restriction and indication of cross-layer IRAP picture distribution", JCT-VC Meeting; Jul. 27-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0147, XP030114616, 3 pp.

Choi et al., "AHG7: On Random access point pictures and picture order counts for MV-HEVC", JCT-3V Meeting; 103. MPEG Meeting; Jan. 17-23, 2013; Genveva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-00081, XP030130497, 3 pp.

Choi, et al., "MV-HEVC/SHVC HLS: Random access of multiple layers", JCT-VC Meeting; Jul. 25-Aug. 2, 2013 Vienna, (Joint Collaborative Team on Video Coding of ISO/IEC JTC1/SC29/WG11 and ITU-T SG.16 ), URL : http://wftp3.itu.int/av-arch/jctvc-site/,, No. JCTVC-N0121-v4, XP030114579, 4 pp.

Hannuksela "MV-HEVC/SHVC HLS: Layer-wise startup of the decoding process", JCT-VC Meeting; MPEG Meeting; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/" No. JCTVC-M0206, XP030114163, 5 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Hannuksela "MV-HEVC/SHVC HLS: Layer-wise startup of the decoding process", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/" No. JCT3V-E0052, XP030131052, 5 pp.

Hannuksela "MV-HEVC/SHVC HLS: on splicing and layer-wise start-up of the decoding", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/" No. JCTVC-O0149, XP030115167, 2 pp.

Ikai et al., "AHG7: RAP picture alignment and slice definition", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0085, XP030130501, 4 pp.

Merkle et al, "Efficient Prediction Structures for Multiview Video Coding", IEEE Trans on Circuits and Systems for Video Technology, vol. 17, No. 11, Nov. 2007, pp. 1461-1473.

Ramasubramonian et al., "MV-HEVC/SHVC HLS: On CL-RAS Pictures", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/., No. JCTVC-O0212, XP030115260, 17 pp.

Ramasubramonian et al., "MV-HEVC/SHVC HLS: Cross-Layer Non-Alignment of IRAP Pictures", JCT-VC Meeting, Jul. 25-Aug. 2, 2013; Vienna, (Joint Collaborative Team on Video Coding of ISO/IEC JTC1/SC29/WG11 and ITU-T SG.16), URL: http://wftp3.itu.int/av-arch/jctvc-site/, No. JCTVC-N0090, XP030114536, 4 pp.

Rapaka et al., "MV-HEVC/SHVC HLS: On Signalling of random accessibility for IRAP pictures in non-IRAP AUs", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F0079, XP030131487, 3 pp.

Schwarz et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 2007, XP011193019, pp. 1103-1120.

Sjoberg, et al., "Overview of HEVC high-level syntax and reference picture management" IEEE Transactions on Circuits and Systems for Video Technology, Jan. 2012, XP055045360, 14 pp.

Tech et al: "MV-HEVC Draft Text 3", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/" No. JCT3V-C1004 d3, XP002727084, 34 pp.

Wang, et al., "AHG9: On cross-layer alignments in HEVC 3DV and scalable extensions," JCT-VC Meeting; MPEG Meeting; Apr. 18-26, 2013; Incheon; (Joint collaborative team on video coding of

(56) References Cited

OTHER PUBLICATIONS

ISO/IEC JTC1/SC29/WG11 and ITU-T SG.16); Retrieved from the Internet No. JCTVC-M0266, XP030114223, 6 pp.
Wang, "AHG9: On CRA and BLA pictures", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/,, No. JCTVc-K0122, XP030113004, 3 pp.
Wang, et al., "MV-HEVC/SHVC HLS: On various cross-layer alignments", JCT-VC Meeting; Jul. 25-Aug. 2, 2013; Vienna; (Joint Collaborative Team on Video Coding of ISO/IEC JTC1/SC29/WG11 and ITU-T SG.16 ); URL: http://wftp3.itu.int/av-arch/jctvc-site/., No. JCTVC-N0084, XP030114530, 5 pp.
Wang et al: "Enhancement-layer IDR picture (EIDR)", JUT Meeting; MPEG Meeting; Oct. 14-21, 2005; Nice, FR;(Joint Video Team of ISO/IEC JTC1/SC29/WG11 and ITU-T SG.16 ) No. JVT-Q065, XP030006226, 7 pp.
Deshpande, et al., "AHG11: Signaling of CRA Pictures", JCT-VC Meeting; MPEG Meeting; Apr. 27-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/., No. JCTVC-I0278, XP030112041, 4 pp.
Hannuksela, et al., "HEVC v1 Scalability Hook: Long-Tern Pictures with Layer Id Values", JCT-VC Meeting, 103. MPEG Meeting, Jan. 14-23, 2013, Geneva, (Joint Collaborative Team on Video Coding of ISO/IEC JTC1/SC29/WG11 and ITU-T SG.16), URL: http"/wftp3.itu.int/av-arch/jctvc-site/, No. JCTVC-L0170, XP030113658, 9 pp.
Wang et al., "AHG9: HEVC HRD Cleanups", JCT-VC Meeting; MPEG Meeting; Jan. 14-23, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-L0044, XP030113532, 4 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Tech, et al., "MV-HEVC Draft Text 4-JCT3V-D1004 v4", Joint Collaborative Team on 3D Video Coding Extension Development of ITU-T SG 16 WP 3 and ISO/IEC JTC 1/SC 29/WG 11 4th Meeting: Incheon, vol. JCT3V-D1004 v4, XP055141490, 62 pp.
Chen, et al., "SHVC Working Draft 2," Joint Collaborative Team on 3D Video Coding Extension Development of ITU-T SG 16 WP 3 and ISO/IEC JTC 1/SC 29/WG 11; Apr. 18-26, 2013, Document: JCTVC-M1008_v1, 53 pp.
Tech, et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pp.
Bross et al., "Editors' proposed corrections to HEVC version 1 ," Joint Collaborative Team on Video Coding (JCT-VC) of ITU-T SG 16 WP 3 and ISO/IEC JTC 1/SC 29/WG 11, JCTVC-M0432_v3, Apr. 18-26, 2013, 310 pp.
McCann, et al., "HM6: High Efficiency Video Coding (HEVC) Test Model 6 Encoder Description," Joint Collaborative Team on Video Coding (JCT-VC) of ITU-T SG 16 WP 3 and ISO/IEC JTC 1/SC 29/WG 11, Document No. JCTVC-H1002, Feb. 1-10, 2012, 53 pp.
International Search Report and Written Opinion from International Application No. PCT/US2014/032926, dated Jul. 29, 2014, 15 pp.
Response to Written Opinion dated Jul. 29, 2014 from International Application No. PCT/US2014/032926, filed Nov. 21, 2014, 21 pp.
Second Written Opinion from International Application No. PCT/US2014/032926, dated Mar. 12, 2015, 10 pp.
Response to Written Opinion dated Mar. 12, 2015 from International Application No. PCT/US2014/032926, filed May 12, 2015, 21 pp.
International Preliminary Report on Patentability from International Application No. PCT/US2014/032926, dated Jul. 6, 2015, 12 pp.

* cited by examiner ised
IRAP ACCESS UNITS AND BITSTREAM SWITCHING AND SPLICING This application claims the benefit of U.S. Provisional Application Ser. No. 61/809,063, filed Apr. 5, 2013, and of U.S. Provisional Application Ser. No. 61/812,225, filed Apr. 15, 2013, the entire contents of each of which are hereby incorporated by reference.

TECHNICAL FIELD

This disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to supporting coding (e.g., encoding and decoding) of pictures in and following partially aligned intra random access point (IRAP) access units. The techniques of this disclosure may be used to support techniques for performing random access starting from partially aligned IRAP access units. A partially aligned IRAP access unit may be an access unit that includes at least one IRAP picture and at least one non-IRAP picture. A video coder may code data that indicate that pictures in layers including non-IRAP pictures in the partially aligned IRAP access unit are not correctly decodable when such random access is performed. In this manner, a video decoder may skip decoding of pictures that are not correctly decodable, when random access is performed starting with the partially aligned IRAP access unit.

In one example, a method of decoding video data includes decoding data that indicates, when performing random access from a partially aligned intra random access point (IRAP) access unit, at least one picture of a video coding layer that is not correctly decodable, decoding an IRAP picture of the IRAP access unit, and decoding video data based on the data that indicates the at least one picture that is not correctly decodable and based on the IRAP picture.

In another example, a method of encoding video data includes encoding an intra random access point (IRAP) picture of a partially aligned IRAP access unit, and encoding data that indicates, when performing random access from a partially aligned intra random access point (IRAP) access unit, at least one picture of a video coding layer that is not correctly decodable.

In another example, a device for coding video data includes a memory storing video data, and a video coder (e.g., a video encoder or a video decoder) configured to code (e.g., encode or decode) an intra random access point (IRAP) picture of a partially aligned IRAP access unit of the video data, and code data that indicates, when performing random access from the partially aligned IRAP access unit, at least one picture of a video coding layer that is not correctly decodable.

In another example, a device for coding video data includes means for coding an intra random access point (IRAP) picture of a partially aligned IRAP access unit of the video data, and means for coding data that indicates, when performing random access from the partially aligned IRAP access unit, at least one picture of a video coding layer that is not correctly decodable.

In another example, a computer-readable storage medium has stored thereon instructions that, when executed, cause a processor of a device for coding video data to code an intra random access point (IRAP) picture of a partially aligned IRAP access unit of the video data, and code data that indicates, when performing random access from the partially aligned IRAP access unit, at least one picture of a video coding layer that is not correctly decodable.

The details of one or more examples are set forth in the accompanying drawings and the description below. Other features, objects, and advantages will be apparent from the description and drawings, and from the claims.

DETAILED DESCRIPTION

Figure 1:
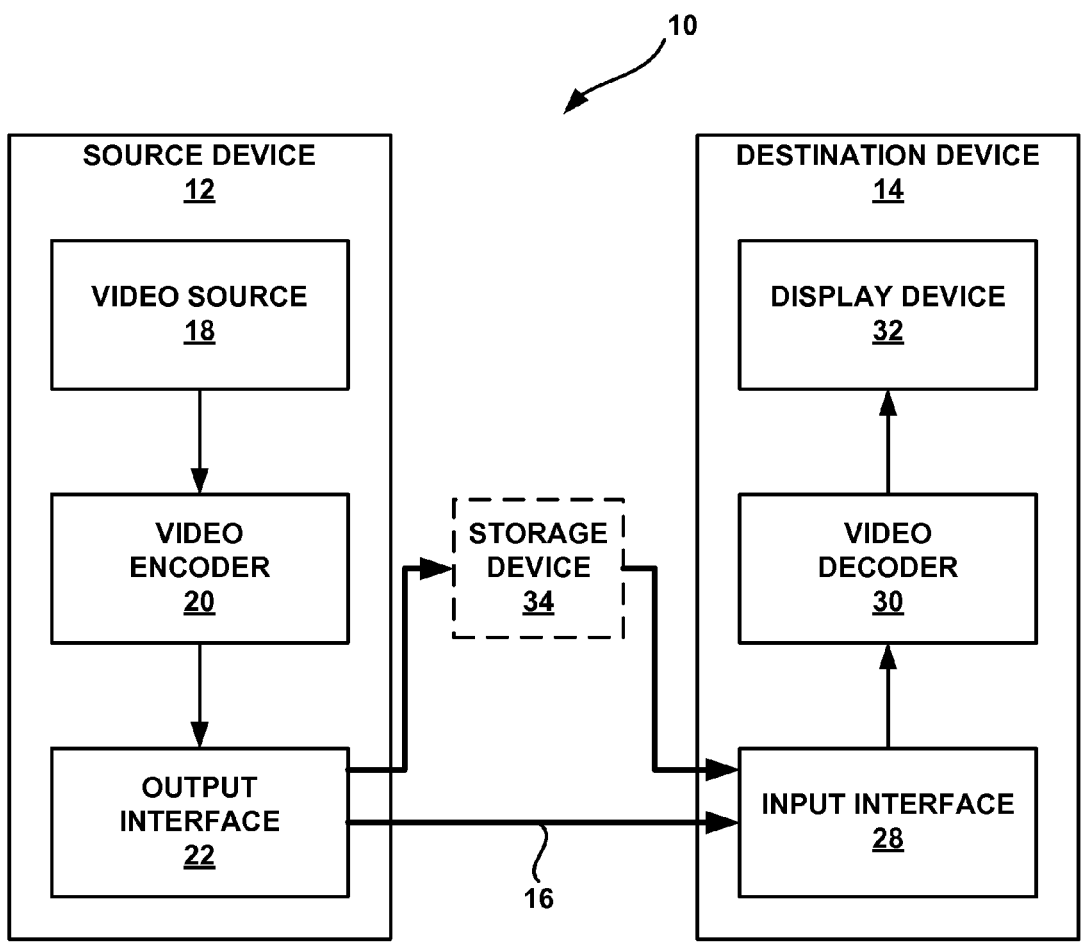
FIG. 1 is a block diagram illustrating an example video encoding and decoding system that may utilize the techniques described in this disclosure.

This disclosure describes techniques for supporting the operations of random access and splicing at access units of a video bitstream that have multiple layers. In particular, the techniques of this disclosure are directed to situations where a multi-layer bitstream includes non-aligned intra random access point (IRAP) access units. A non-aligned IRAP access unit, also referred to herein as a partially aligned IRAP access unit, includes at least one IRAP picture and at least one non-IRAP picture. The IRAP picture may comprise, for example, an instantaneous decoder refresh (IDR) picture, a clean random access (CRA) picture, or a broken link access (BLA) picture. The techniques of this disclosure provide support for cases in which not all the pictures in an IRAP access unit are IRAP pictures. An access unit includes all coded pictures pertaining to a particular output time, along with their associated non-VCL NAL units. A layer may be a scalable layer, a view, a depth component of a view, a texture component of a view, and so on.

In general, the techniques of this disclosure support situations where random access is performed starting from a partially aligned IRAP access unit. For example, the partially aligned IRAP access unit may include an IRAP picture in a base layer and a non-IRAP picture in an enhancement layer. Because random access is performed starting from the partially aligned IRAP access unit, assuming that the non-IRAP picture of the enhancement layer is at least partially predicted using temporal inter-prediction, the non-IRAP picture of the enhancement layer will not be decodable. That is, a preceding picture on which the non-IRAP picture depends will not have been retrieved. Additionally, one or more subsequent pictures to the non-IRAP picture in the enhancement layer may also not be decodable. Such pictures that are not correctly decodable may be referred to as enhancement layer discardable (ELDISC) pictures. It should be understood that the phrase "not correctly decodable" refers to pictures that, when by a video decoder, are not the same as when reproduced by a video encoder. This may arise when, for example, reference pictures for these pictures are not received, e.g., when the reference pictures precede a corresponding IRAP access unit in decoding order, and when the IRAP access unit is used for random access.

In accordance with the techniques of this disclosure, a video encoder may signal that certain pictures are not correctly decodable when performing random access from a partially aligned IRAP access unit. Such non-decodable pictures may include those that are in an enhancement layer for which the IRAP access unit does not include an IRAP picture and that are in the same coded video sequence (CVS) as the IRAP access unit. In this manner, a video decoder may determine which pictures are not correctly decodable when performing random access from a partially aligned IRAP access unit, and skip decoding of the non-decodable pictures. Instead, the video decoder may simply parse data of the non-decodable pictures, without attempting to decode these pictures. In this manner, the video decoder may simply, quickly, and efficiently determine that such pictures are not correctly decodable from the signaled data, such that the video decoder may simply determine to perform a procedure for non-existent pictures for these pictures or skip decoding of these pictures.

The data that is signaled for the non-decodable pictures may include, for example, a particular network abstraction layer (NAL) unit type for NAL units of the pictures. Additionally or alternatively, the data may include a flag or other syntax element indicating whether a picture is decodable when a coded video sequence including the picture is randomly accessed starting with a partially aligned access unit. The flag or syntax element may be, for example, slice header data, data included in a NAL unit header, data included in a picture parameter set (PPS), a sequence parameter set (SPS), or other such data.

It should be understood that the data that indicates that a particular picture is not correctly decodable is separate from the coded image data itself, that is, data for coded blocks of the picture. That is, the data that indicates that a particular picture is not correctly decodable can be parsed and interpreted without actually attempting to decode the picture. In this manner, data that indicates that a picture is not correctly decodable may be interpreted prior to attempting to decode the picture, so that a decoder can avoid attempting to decode a picture that is not decodable and signaled to be non-decodable. Instead, the video decoder may simply parse data of a non-decodable picture without attempting to decode the data of the picture. Alternatively, the video decoder may perform a non-existent picture process to decode these pictures.

Allowing partially aligned IRAP access units can provide various benefits. For instance, a base layer can include more frequent IRAP pictures than an enhancement layer. This may reduce tune-in delay for a client device, in that the client device can begin decoding and displaying video data of the base layer, even if the enhancement layer data is not yet decodable. Additionally, this allows fine grain selection of random access points. Moreover, because the enhancement layer does not need to include IRAP pictures as frequently as the base layer, the bitrate for the enhancement layer can be reduced.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High-Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD10 hereinafter, is available from http://phenix.int-evry.fr/jct/doc_end_user/documents/12_Geneva/wg11/JCTVC-L1003-v34.zip.

The multiview extension to HEVC, namely MV-HEVC, is also being developed by the JCT-3V and is hereby incorporated by reference in its entirety. A recent Working Draft (WD) of MV-HEVC (document: JCT3V-C1004_d3) referred to as MV-HEVC WD3 hereinafter, is available from http://phenix.it-sudparis.eu/jct2/doc_end_user/documents/3_Geneva/wg11/JCT3V-C1004-v4.zip.

The scalable extension to HEVC, named SHVC, is also being developed by the JCT-VC and is hereby incorporated by reference in its entirety. A recent Working Draft (WD) of SHVC (document: JCTVC-L1008) and referred to as SHVC WD1 hereinafter, is available from http://phenix.int-evry.fr/jct/doc_end_user/documents/12_Geneva/wg11/JCTVC-L1008-v1.zip.

IRAP pictures and access units in HEVC are discussed below. In HEVC with single-layer coding, the following concepts of IRAP picture and IRAP AU apply.

IRAP pictures are pictures that contain only I slices, and have the property that a decoding process starting at the IRAP picture in decoding order can correctly decode all non-random access skipped leading (non-RASL) pictures that succeed the IRAP picture in decoding order, without performing the decoding of any picture that precedes the IRAP in decoding order. An IRAP picture may be a broken link access (BLA) picture, a clean random access (CRA) picture, or an instantaneous decoding refresh (IDR) picture. There may be RASL pictures associated with an IRAP picture that are not correctly decodable when performing random access starting with the IRAP picture.

An access unit containing an IRAP picture is an IRAP access unit is discussed below.

Splicing and bitstream switching are discussed below.

Bitstream switching and splicing operations consist of the process of joining two bitstreams to result in one bitstream, with minimal changes to the bitstream at the point of splicing and nearly seamless transition. Typically, both of two original bitstreams start at a random access point—typically, an IRAP access unit.

One typical use case of splicing is when TV commercials are to be inserted in between media data. Another typical use case of splicing is bitstream switching in adaptive video streaming.

IRAP pictures in MV-HEVC and SHVC are discussed below.

In MV-HEVC or SHVC, a term of layer component may be used to specify a collection of the coded VCL NAL units of the access unit with a unique nuh_layer_id, same as the term of picture in MV-HEVC WD3 and SHVC WD1. The term layer component may also be used to specify the decoded VCL NAL units, which is a decoded representation of the video at a certain time instance of a unique layer.

In MV-HEVC WD3 and SHVC WD1, IDR and BLA layer components (pictures) are aligned across layers, whereas CRA pictures are not. For example, when IDR layer components are required to be aligned, if any picture in an AU is an IDR picture, then all pictures in the AU are IDR layer components, i.e., with a NAL unit type of IDR_W_RADL or IDR_N_LP. Similarly, when BLA pictures are required to be aligned, if any layer component in an access unit is a BLA layer component, then all layer components in the AU are BLA pictures.

In this disclosure, it is assumed that an AU consists of all coded pictures pertaining to a particular output time, along with their associated non-VCL NAL units.

In HEVC extensions, a bitstream may have one or more layers. According to the latest working draft, the IDR and BLA layer components (pictures) have to be aligned across the different layers in an access unit, whereas there is no such restriction on CRA pictures.

Currently there is no mechanism to support simple random access or splicing operations at certain AUs that do not have all the pictures as IRAP pictures, so that at most changing of the NAL unit type values in the NAL unit headers of some layer components is needed. When random access or bitstream switching is performed at an access unit where only the base layer is a CRA picture, it is not possible to correctly decode and output higher layer pictures until another IRAP layer component occurs in that layer. To support the above simple random access or bitstream splicing operations, appropriate handling of such higher layer pictures is needed.

This disclosure describes several examples that provide methods to provide means to perform random access and bitstream splicing at AUs wherein the IRAP pictures are not aligned (i.e. not all pictures in the AU are IRAP pictures). Some of the examples are as follows:
1. Define IRAP AUs to include AUs with partial alignment of IRAP pictures (i.e. AUs wherein some layer components are IRAP pictures while some other layer components are not IRAP pictures). Such IRAP AUs are referred to as partially-aligned IRAP AUs.
2. Allow a conforming bitstream to start with a partially-aligned IRAP AU.
3. Provide an indication of layer components that are non-decodable when splicing is performed at a partially-aligned IRAP AU.
4. Indicate for each non-base layer component (i.e. a layer component that does not belong to a layer with nuh_layer_id equal to 0) whether it is decodable when performing splicing from an IRAP AU.
5. Specify a decoding process of non-decodable pictures to require that their syntax and other characteristics comply with bitstream conformance requirements.

One feature of this disclosure involves the notion of including some access units where not all the pictures are IRAP as an IRAP access unit. This is achieved by defining partially-aligned IRAP access units. An illustration of the alignment of IRAP pictures different access units is given in FIG. 5, and detailed descriptions are given in the following sections.

Figure 5:
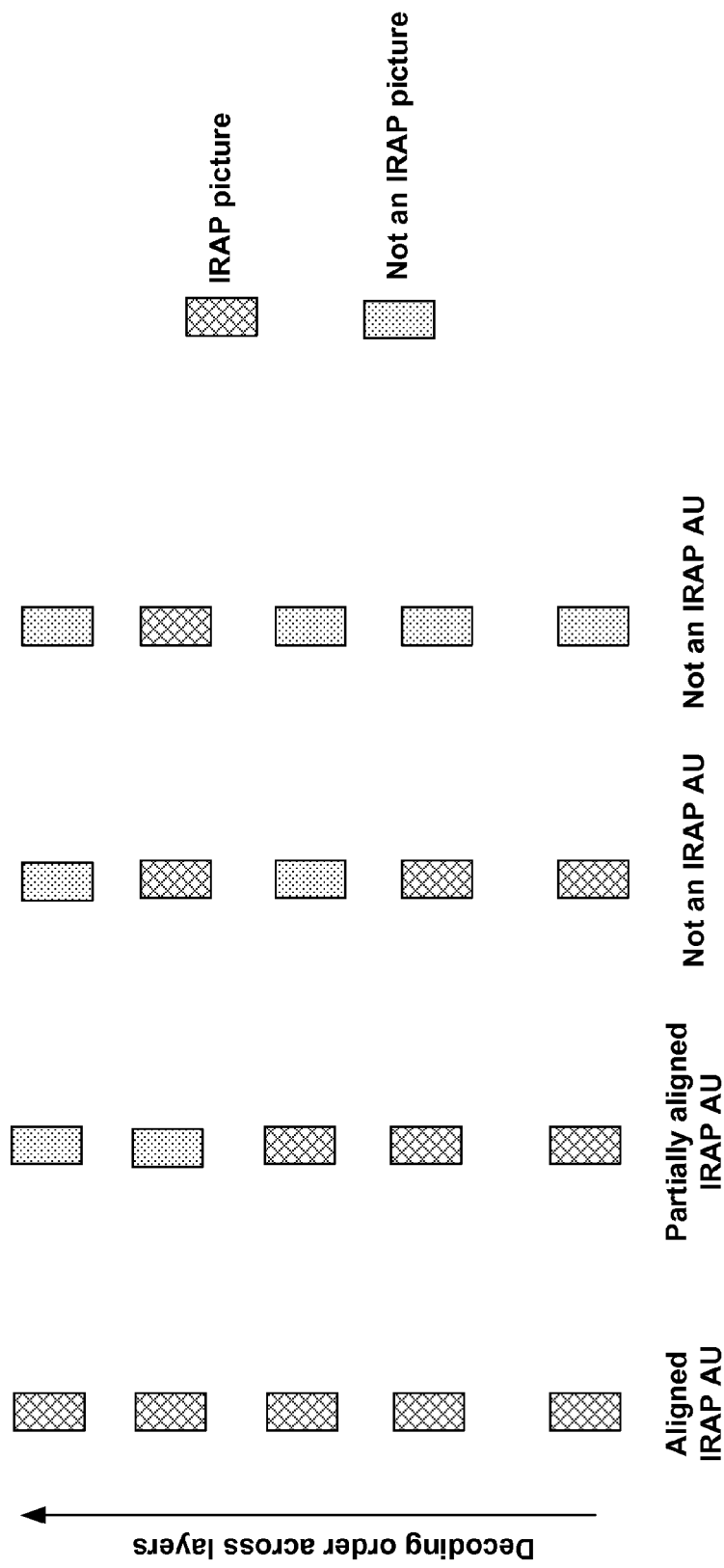
FIG. 5 shows an example of different alignment of intra random access point (IRAP) pictures in access units.
Figure 6:
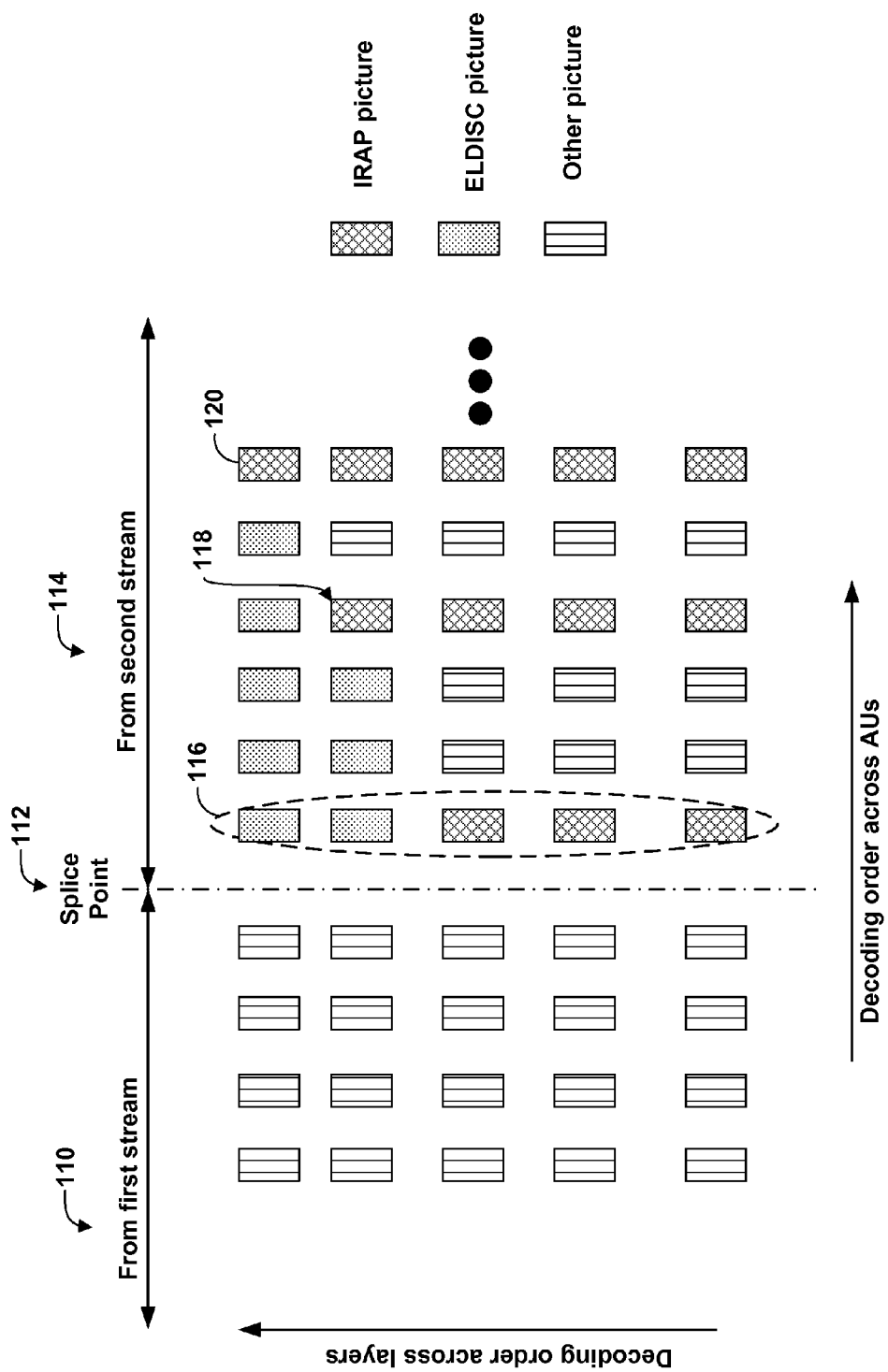
FIG. 6 shows an example of splicing at a partially-aligned IRAP access unit (AU).

FIG. 5 shows an example of different alignment of IRAP pictures in access units. The left to right alignment of the AUs does not indicate their decoding order. FIG. 6 shows an example of splicing at a partially-aligned IRAP AU. ELDISC pictures are pictures that are non-decodable due to the splicing operation.

A first example is described below. In this example, the pictures in a bitstream that are not correctly decodable when decoding starts from the previous (partially-aligned) IRAP access unit in decoding order are assigned a new NAL unit type. When decoding starts from a partially-aligned IRAP AU, these pictures are not output and the process to generate unavailable pictures is invoked. Additionally, it is assumed that IDR pictures in an AU are cross-layer aligned, while BLA picture may not be cross-layer aligned.

For purposes of example, this disclosure assumes the following definitions:

IRAP access unit (AU): An access unit containing one or more IRAP pictures where for each IRAP picture with layer ID nuh_layer_id, all the pictures in the AU with layer ID less than nuh_layer_id are also IRAP.

aligned IRAP AU: An IRAP AU in which all the pictures in the AU are IRAP pictures.

partially-aligned IRAP AU: An IRAP AU that is not an aligned IRAP AU.

ELDISC picture: A trailing picture that has non-zero layer ID layerId and that belongs to a partially-aligned IRAP AU that has access layer ID less than layerId or belongs to a subsequent AU, in decoding order, that precedes, in decoding order, any partially-aligned IRAP AU with access layer ID greater than or equal to layerId.

access layer ID: The access layer ID of an IRAP AU is the greatest value of nuh_layer_id of all IRAP pictures in the IRAP AU.

Signaling non-decodability of EL pictures is discussed below.

NAL Unit Header Semantics

Two NAL unit types, ELDISC_R and ELDISC_N, are introduced that are shown in the table given below. The changes to the semantics of NAL unit types are also described below. Changes are shown using italicized text to represent additions and [removed: " "] to represent deletions.

forbidden_zero_bit shall be equal to 0.

nal_unit_type specifies the type of RBSP data structure contained in the NAL unit as specified in Table 7-1.

NAL units that have nal_unit_type in the range of UNSPEC48 . . . UNSPEC63, inclusive, for which semantics are not specified, shall not affect the decoding process specified in this Specification.

NOTE 1—NAL unit types in the range of UNSPEC48 . . . UNSPEC63 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values.

For purposes other than determining the amount of data in the decoding units of the bitstream (as specified in Annex C of WD 10), decoders shall ignore (remove from the bitstream and discard) the contents of all NAL units that use reserved values of nal_unit_type.

NOTE 2—This requirement allows future definition of compatible extensions to this Specification.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 | ELDISC_N | Coded slice segment of an ELDISC picture | VCL |
| 25 | ELDISC_R | | |
| [removed: "24"] 26 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 41 . . . 47 | RSV_NVCL41..RSV_NVCL47 | Reserved | non-VCL |
| 48 . . . 63 | UNSPEC48 . . . UNSPEC63 | Unspecified | non-VCL |

NOTE 3—A CRA picture may have associated RASL or RADL pictures present in the bitstream.

NOTE 4—A BLA picture having nal_unit_type equal to BLA_W_LP may have associated RASL or RADL pictures present in the bitstream. A BLA picture having nal_unit_type equal to BLA_W_RADL does not have associated RASL pictures present in the bitstream, but may have associated RADL pictures in the bitstream. A BLA picture having nal_unit_type equal to BLA_N_LP does not have associated leading pictures present in the bitstream.

NOTE 5—An IDR picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

NOTE 6—A sub-layer non-reference picture is not included in any of RefPicSetStCurrBefore, RefPicSetStCurrAfter and RefPicSetLtCurr of any picture with the same value of TemporalId, and may be discarded without affecting the decodability of other pictures with the same value of TemporalId.

All coded slice segment NAL units of an access unit shall have the same value of nal_unit_type. A picture or an access unit is also referred to as having a nal_unit_type equal to the nal_unit_type of the coded slice segment NAL units of the picture or access unit.

If a picture has nal_unit_type equal to ELDISC_N, TRAIL_N, TSA_N, STSA_N, RADL_N, RASL_N, RSV_VCL_N10, RSV_VCL_N12, or RSV_VCL_N14, the picture is a sub-layer non-reference picture. Otherwise, the picture is a sub-layer reference picture.

It is a requirement of bitstream conformance that an ELDISC picture that belongs to an IRAP AU shall be a sub-layer reference picture.

Each picture, other than the first picture in the bitstream in decoding order, is considered to be associated with the previous IRAP picture in decoding order.

When a picture is a leading picture, it shall be a RADL or RASL picture.

When a picture is a trailing picture, it shall not be a RADL or RASL picture.

When a picture is a leading picture, it shall precede, in decoding order, all trailing pictures that are associated with the same IRAP picture.

No RASL pictures shall be present in the bitstream that are associated with a BLA picture having nal_unit_type equal to BLA_W_RADL or BLA_N_LP.

No RASL pictures shall be present in the bitstream that are associated with an IDR picture.

No RADL pictures shall be present in the bitstream that are associated with a BLA picture having nal_unit_type equal to BLA_N_LP or that are associated with an IDR picture having nal_unit_type equal to IDR_N_LP.

NOTE 7—It is possible to perform random access at the position of an IRAP access unit by discarding all access units before the IRAP access unit (and to correctly decode the IRAP picture and all the subsequent non-RASL pictures in decoding order), provided each parameter set is available (either in the bitstream or by external means not specified in this Specification) when it needs to be activated.

Any picture that has PicOutputFlag equal to 1 that precedes an IRAP picture in decoding order shall precede the IRAP picture in output order and shall precede any RADL picture associated with the IRAP picture in output order.

Any RASL picture associated with a CRA or BLA picture shall precede any RADL picture associated with the CRA or BLA picture in output order.

Any RASL picture associated with a CRA picture shall follow, in output order, any IRAP picture that precedes the CRA picture in decoding order.

When sps_temporal_id_nesting_flag is equal to 1 and TemporalId is greater than 0, the nal_unit_type shall be equal to TSA_R, TSA_N, RADL_R, RADL_N, RASL_R, or RASL_N.

nuh_layer_id shall be equal to 0. Other values of nuh_layer_id may be specified in the future by ITU-T|ISO/IEC. For purposes other than determining the amount of data in the decoding units of the bitstream (as specified in Annex C), decoders shall ignore (i.e. remove from the bitstream and discard) all NAL units with values of nuh_layer_id not equal to 0.

NOTE 8—It is anticipated that in future scalable or 3D video coding extensions of this specification, this syntax element will be used to identify additional layers that may be present in the CVS, wherein a layer may be, e.g. a spatial scalable layer, a quality scalable layer, a texture view or a depth view.

If nal_unit_type is equal to ELDISC_R or ELDISC_N, i.e. the coded slice segment belongs to a ELDISC picture, the value of nuh_layer_id shall be greater than zero.

Alternatively, if nal_unit_type is equal to ELDISC_R or ELDISC_N, i.e. the coded slice segment belongs to an ELDISC picture, the value of nuh_layer_id shall be restricted as follows:

if the current AU is an IRAP AU, nuh_layer_id shall be greater than the access layer ID of the current AU else, the value of nuh_layer_id shall be greater than the access layer ID of the previous IRAP AU nuh_temporal_id_plus1 minus 1 specifies a temporal identifier for the NAL unit. The value of nuh_temporal_id_plus1 shall not be equal to 0.

The variable TemporalId is specified as follows:

$$TemporalId = nuh\_temporal\_id\_plus1 - 1 \qquad (7-1)$$

If nal_unit_type is in the range of BLA_W_LP to RSV_I-RAP_VCL23, inclusive, i.e. the coded slice segment belongs to an IRAP picture, TemporalId shall be equal to 0.

Otherwise, when nal_unit_type is equal to TSA_R, TSA_N, STSA_R, or STSA_N, TemporalId shall not be equal to 0.

The value of TemporalId shall be the same for all VCL NAL units of an access unit. The value of TemporalId of an access unit is the value of the TemporalId of the VCL NAL units of the access unit.

The value of TemporalId for non-VCL NAL units is constrained as follows:

If nal_unit_type is equal to VPS_NUT or SPS_NUT, TemporalId shall be equal to 0 and the TemporalId of the access unit containing the NAL unit shall be equal to 0.

Otherwise if nal_unit_type is equal to EOS_NUT or EOB_NUT, TemporalId shall be equal to 0.

Otherwise, if nal_unit_type is equal to AUD_NUT or FD_NUT, TemporalId shall be equal to the TemporalId of the access unit containing the NAL unit.

Otherwise, TemporalId shall be greater than or equal to the TemporalId of the access unit containing the NAL unit.

NOTE 9—When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all PPSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information, e.g. in a buffering period SEI message or a picture timing SEI message, that applies to a bitstream subset that includes access units for which the TemporalId values are greater than the TemporalId of the access unit containing the SEI NAL unit.

Alternatively, no new NAL unit types for the ELDISC pictures. It must be noted here that ELDISC pictures can be a trailing picture, a TSA picture or an STSA picture.

The general decoding process is discussed below.

The decoding process is the same as defined in sub-clause F.8 in SHVC WD1 some changes, and the changes in each modified subclause in the decoding process for SHVC WD1 and HEVC WD10 are given below.

Changes to sub-clause F.8.1 in SHVC WD1 are discussed below.

The specifications in subclause 8.1 apply with the following additions. When the current picture has nuh_layer_id greater than 0, the following applies.

Depending on the value of separate_colour_plane_flag, the decoding process is structured as follows:

If separate_colour_plane_flag is equal to 0, the following decoding process is invoked a single time with the current picture being the output.

Otherwise (separate_colour_plane_flag is equal to 1), the following decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1 and 2 being assigned to $S_L$, $S_{Cb}$, and $S_{Cr}$, respectively.

NOTE—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic.

The variable NoELDiscPicDecodeFlag for each picture is derived as specified in the section titled Derivation of NoELDiscPicDecodeFlag If CurrPic has nuh_layer_id equal to zero and belongs to an IRAP AU, the variable NoRaslOutputFlag for the AU is derived as follows If the picture with nuh_layer_id equal to 0 in the IRAP AU has NoRaslOutputFlag equal to 1, then the variable NoRaslOutputFlag for the current IRAP AU is set equal to 1.

Otherwise, NoRaslOutputFlag for the current IRAP AU is set equal to 0.

For the decoding of the slice segment header of the first slice, in decoding order, of the current picture, the decoding process for starting the decoding of a coded picture with nuh_layer_id greater than 0 specified in subclause F.8.1.1 is invoked.

If ViewId[nuh_layer_id] is greater than 0, the decoding process for a coded picture with nuh_layer_id greater than 0 specified in subclause G.8.1 is invoked.

Otherwise, when DependencyId[nuh_layer_id] is greater than 0, the decoding process for a coded picture with nuh_layer_id greater than 0 specified in subclause F.8.1.1 is invoked.

After all slices of the current picture have been decoded, the decoding process for ending the decoding of a coded picture with nuh_layer_id greater than 0 specified in subclause F.8.1.2 is invoked.

Derivation of NoELDiscPicDecodeFlag

The variable NoELDiscPicDecodeFlag is derived as follows:

If the current AU is an IRAP AU, the following applies:
If NoRaslOutputFlag is equal to 1 for the picture with nuh_layer_id equal to 0 in the current AU, the following applies:
If nuh_layer_id of the current picture is greater than the access layer ID of the current A U, NoELDiscPicDecodeFlag is set equal to 1.
Otherwise, NoELDiscPicDecodeFlag is set equal to 0.

Otherwise (the picture with nuh_layer_id equal to 0 in the current AU is a CRA picture with NoRaslOutputFlag equal to 0), the following applies:
If the current picture is an IRAP picture, NoELDiscPicDecodeFlag is set equal to 0.
Otherwise, NoELDiscPicDecodeFlag is set equal to the value of NoELDiscPicDecodeFlag of the preceding picture, in decoding order, in the same layer.

Otherwise, the following applies:
NoELDiscPicDecodeFlag is set equal to the value of NoELDiscPicDecodeFlag of the preceding picture, in decoding order, in the same layer.

Alternatively, NoELDiscPicDecodeFlag is not inferred for ELDISC pictures but rather signaled in the slice header or specified via external means.

Alternatively, for each IRAP AU, a layer set is signalled indicating which pictures are IRAP in that particular AU; the pictures in the IRAP AU whose layer IDs are not included in the layer set would be considered non-decodable. The value of NoELDiscPicDecodeFlag can be inferred to be equal to one for all the pictures in that CVS that are not included in the signalled layer set. This layer set may be signaled either using an SEI message or via external means.

Changes to subclause F.8.1.1 in SHVC WD1 are discussed below. Each picture referred to in this subclause is a complete coded picture. The decoding process operates as follows for the current picture CurrPic:

1. The decoding of NAL units is specified in subclause 8.2.
2. The processes in subclause 8.3 specify the following decoding processes using syntax elements in the slice segment layer and above:

Variables and functions relating to picture order count are derived in subclause 8.3.1. This needs to be invoked only for the first slice segment of a picture. [removed: "It is a requirement of bitstream conformance that PicOrderCntVal shall remain unchanged within an access unit."]

The decoding process for RPS in subclause 8.3.2 is invoked for pictures with nuh_layer_id equal to that of CurrPic, wherein reference pictures may be marked as "unused for reference" or "used for long-term reference". This needs to be invoked only for the first slice segment of a picture.

When CurrPic is a BLA picture or is a CRA picture with NoRaslOutputFlag equal to 1 or an ELDISC picture with NoELDiscPicDecodeFlag equal to 1 and belongs to an IRAP AU, the decoding process for generating unavailable reference pictures specified in subclause 8.3.3 is invoked, which needs to be invoked only for the first slice segment of a picture.

Changes to subclause F.8.1.2 in SHVC WD1 are discussed below. PicOutputFlag is set as follows:

If the current picture is a RASL picture and NoRaslOutputFlag of the associated IRAP picture is equal to 1, or an ELDISC picture with NoELDiscPicDecodeFlag equal to 1, PicOutputFlag is set equal to 0.

Otherwise, PicOutputFlag is set equal to pic_output_flag.

The following applies:

The decoded picture is marked as "used for short-term reference".

When TemporalId is equal to HighestTid, the marking process for sub-layer non-reference pictures not needed for inter-layer prediction specified in subclause F.8.1.2.1 is invoked with latestDecLayerId equal to nuh_layer_id as input.

Changes to subclause 8.3.1. in HEVC WD10 are discussed below.

Output of this process is PicOrderCntVal, the picture order count of the current picture.

Picture order counts are used to identify pictures, for deriving motion parameters in merge mode and motion vector prediction, and for decoder conformance checking (see subclause C.5).

Each coded picture is associated with a picture order count variable, denoted as PicOrderCntVal.

When the current picture does not belong to [removed: "is not"] an IRAP access unit [removed: "picture"] with NoRaslOutputFlag equal to 1, the variables prevPicOrderCntLsb and prevPicOrderCntMsb are derived as follows:

Let prevTid0Pic be the previous picture in decoding order that has TemporalId equal to 0 and that is not a RASL picture, a RADL picture, or a sub-layer non-reference picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture belongs to [removed: "is"] an IRAP access unit [removed: "picture"] with NoRaslOutputFlag equal to 1, PicOrderCntMsb is set equal to 0.

Otherwise, PicOrderCntMsb is derived as follows:

```
if( ( slice_pic_order_cnt_lsb <
    prevPicOrderCntLsb ) &&
  ( ( prevPicOrderCntLsb −
slice_pic_order_cnt_lsb ) >= ( MaxPicOrderCntLsb / 2 ) ) )
  PicOrderCntMsb = prevPicOrderCntMsb +          (8-1)
    MaxPicOrderCntLsb
else if( (slice_pic_order_cnt_lsb > prevPicOrderCntLsb ) &&
    ( ( slice_pic_order_cnt_lsb − prevPicOrderCntLsb ) > (
MaxPicOrderCntLsb / 2 ) ) )
  PicOrderCntMsb = prevPicOrderCntMsb −
    MaxPicOrderCntLsb
else
  PicOrderCntMsb = prevPicOrderCntMsb
PicOrderCntVal is derived as follows:
  PicOrderCntVal = PicOrderCntMsb +              (8-2)
    slice_pic_order_cnt_lsb
```

NOTE 1—All IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

The value of PicOrderCntVal shall be in the range of $-2^{31}$ to $2^{31}-1$, inclusive. In one CVS, the PicOrderCntVal values for any two coded pictures shall not be the same.

The function PicOrderCnt(picX) is specified as follows:

PicOrderCnt(picX)=PicOrderCntVal of the picture picX     (8-3)

The function DiffPicOrderCnt(picA, picB) is specified as follows:

DiffPicOrderCnt(picA,picB)=PicOrderCnt(picA)−PicOrderCnt(picB)     (8-4)

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

Changes to subclause 8.3.2 in HEVC WD10 are discussed below.

This process is invoked once per picture, after decoding of a slice header but prior to the decoding of any coding unit and prior to the decoding process for reference picture list construction for the slice as specified in subclause 8.3.3. This process may result in one or more reference pictures in the DPB being marked as "unused for reference" or "used for long-term reference".

NOTE 1—The RPS is an absolute description of the reference pictures used in the decoding process of the current and future coded pictures. The RPS signaling is explicit in the sense that all reference pictures included in the RPS are listed explicitly.

A decoded picture in the DPB can be marked as "unused for reference", "used for short-term reference", or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both).

When the current picture belongs to an IRAP AU [removed: "picture"] with NoRaslOutputFlag equal to 1, all reference pictures currently in the DPB (if any) are marked as "unused for reference".

Short-term reference pictures are identified by their PicOrderCntVal values. Long-term reference pictures are identified either by their PicOrderCntVal values or their slice_pic_order_cnt_lsb values.

. . . .

When the current picture is a picture that follows, in decoding order, an STSA picture that has TemporalId equal to that of the current picture, there shall be no picture that has TemporalId equal to that of the current picture included in RefPicSetStCurrBefore, RefPicSetStCurrAfter, or RefPicSetLtCurr that precedes the STSA picture in decoding order.

When the current picture is a CRA picture, there shall be no picture included in the RPS that precedes, in decoding order, any preceding IRAP picture in decoding order (when present).

When the current picture is a trailing picture that is not an ELDISC picture with NoELDiscPicDecodeFlag equal to 1, there shall be no picture in RefPicSetStCurrBefore, RefPicSetStCurrAfter, or RefPicSetLtCurr that was generated by the decoding process for generating unavailable reference pictures as specified in subclause 8.3.3.

When the current picture is a trailing picture, there shall be no picture in the RPS that precedes the associated IRAP picture in output order or decoding order.

. . . .

A second example is described below. This example is similar to the first example, but no new NAL unit type is defined. One reserved flag in the slice header is used to indicate whether the slice belongs to a picture that belongs to an IRAP AU.

Slice Header Segment Syntax num_extra_slice_header_bits [removed: "equal to 0 specifies that no"] indicates the number of extra slice header bits that are present in the slice header RBSP for coded pictures referring to the PPS. num_extra_slice_header_bits shall be equal to or greater than 1 [removed: "0 in bitstreams conforming to this version of this Specification"]. Other values for num_extra_slice_header_bits are reserved for future use by ITU-T|ISO/IEC. However, decoders shall allow num_extra_slice_header_bits to have any value.

The syntax of slice_in_irap_au_flag is specified as follows:

slice_in_irap_au_flag equal to 1 specifies that the slice is present in a picture that belongs to an IRAP AU. slice_in_irap_au_flag equal to 0 specifies that the slice is present in a picture that does not belong to an IRAP AU.

A third example is described below. In this example, IRAP AUs include any AU that includes an IRAP picture with nuh_layer_id equal to 0. Two additional IRAP NAL unit types are used to indicate the first IDR picture in each layer in the bitstream, when the decoding starts from an IRAP AU that is the current AU or the previous IRAP AU in decoding order. In addition, two more NAL unit types would be used to indicate those pictures that would not be decodable when the bitstream is spliced. It is assumed that BLA pictures and IDR pictures may not be cross-layer aligned.

This example assumes the following definitions:

IRAP access unit (AU): An access unit containing one or more IRAP pictures where the picture in the AU with nuh_layer_id equal to 0 is an IRAP picture.

aligned IRAP AU: An IRAP AU in which all the pictures in the AU are IRAP pictures.

partially-aligned IRAP AU: An IRAP AU that is not an aligned IRAP AU and for every IRAP picture in the AU with nuh_layer_id equal to layerId, every picture in the AU with nuh_layer_id value less than layerId, is also an IRAP picture.

non-aligned IRAP AU: An IRAP AU that is neither an aligned IRAP AU nor a partially aligned IRAP AU.

layer-switch IRAP AU: An AU that is not an IRAP AU and contains at least one IRAP picture.

access layer ID: The access layer ID of an IRAP AU is the greatest value of nuh_layer_id layerId for which all pictures in the AU with nuh_layer_id less than or equal to layerId are IRAP pictures.

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     *slice_in_irap_au_flag* | *u(1)* |
|     for( i = 0; i < num_extra_slice_header_bits − 1; i++ ) | |
|       slice_reserved_flag[ i ] | u(1) |
|     slice_type | ue(v) |
|     ... | |

The syntax elements of num_extra_slice_header_bits is changed as shown below, where italics represents additions and [removed: " "] represents deletions.

cross-layer random access skip picture: A picture with nuh_layer_id equal to layerId that belongs to a IRAP AU with access layer ID less than layerId, or belongs to an AU that succeeds, in decoding order, an IRAP AU with access layer ID less than layerId and precedes, in decoding order, the next IRAP AU and also precedes, in decoding order, a layer-switch IRAP AU that contains an IRAP picture with nuh_layer_id equal to layerId.

CL-RASP: a picture with nal_unit_type equal to CL_RAS_N or CL_RAS_R.

It is a requirement of bitstream conformance that a cross-layer random access skip picture that belongs to an IRAP AU shall be a sub-layer reference picture.

instantaneous decoding refresh (IDR) picture: An IRAP picture for which each VCL NAL unit has nal_unit_type equal to BL_IDR_W_RADL, BL_IDR_N_LP, IDR_W_RADL or IDR_N_LP.

NOTE 7—An IDR picture contains only I slices, and may be the first picture in the bitstream in decoding order, or may appear later in the bitstream. Each IDR picture with nuh_layer_id equal to 0 is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

Alternatively, the following constraint is added:

It is a requirement of bitstream conformance that for every current layer-switch IRAP AU that has an IRAP picture with nuh_layer_id equal to layerId and whose preceding IRAP AU in decoding order has a access layer ID value less than nuh_layer_id, there shall be at least one layer-switch AU that has an IRAP picture with nuh_layer_id equal to layer_id_in_nuh[LayerIdInVps[layerId]−1] and that precedes, in decoding order, the current layer-switch IRAP AU and succeeds, in decoding order, the previous IRAP AU.

NAL unit header semantics are discussed below.

Four NAL unit types are introduced are shown in the table given below. The changes to the semantics of NAL units type are represented using italicized text to represent additions and [removed: " "] to represent deletions.

forbidden_zero_bit shall be equal to 0.

nal_unit_type specifies the type of RBSP data structure contained in the NAL unit as specified in Table 7-1.

NAL units that have nal_unit_type in the range of UNSPEC48 . . . UNSPEC63, inclusive, for which semantics are not specified, shall not affect the decoding process specified in this Specification.

NOTE 1—NAL unit types in the range of UNSPEC48 . . . UNSPEC63 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values.

For purposes other than determining the amount of data in the decoding units of the bitstream (as specified in Annex C), decoders shall ignore (remove from the bitstream and discard) the contents of all NAL units that use reserved values of nal_unit_type.

NOTE 2—This requirement allows future definition of compatible extensions to this Specification.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | *BL_IDR_W_RADL* | *Coded slice segments of a BL-IDR picture slice_segment_layer_rbsp( )* | VCL |
| 23 | *BL_IDR_N_LP* | | |
| 24 | *CL_RAS_N* | *Coded slice segment of an clean-random access skip picture* | *VCL* |
| 25 | *CL_RAS_R* | | |
| [removed: "24"] *26* . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | non-VCL |
| 41 ... 47 | RSV_NVCL41 ... RSV_NVCL47 | Reserved | non-VCL |
| 48 ... 63 | UNSPEC48 ... UNSPEC63 | Unspecified | non-VCL |

NOTE 3—A CRA picture may have associated RASL or RADL pictures present in the bitstream.

NOTE 4—A BLA picture having nal_unit_type equal to BLA_W_LP may have associated RASL or RADL pictures present in the bitstream. A BLA picture having nal_unit_type equal to BLA_W_RADL does not have associated RASL pictures present in the bitstream, but may have associated RADL pictures in the bitstream. A BLA picture having nal_unit_type equal to BLA_N_LP does not have associated leading pictures present in the bitstream.

NOTE 5—An IDR picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

NOTE 6—A sub-layer non-reference picture is not included in any of RefPicSetStCurrBefore, RefPicSetStCurrAfter and RefPicSetLtCurr of any picture with the same value of TemporalId, and may be discarded without affecting the decodability of other pictures with the same value of TemporalId.

All coded slice segment NAL units of an access unit shall have the same value of nal_unit_type. A picture or an access unit is also referred to as having a nal_unit_type equal to the nal_unit_type of the coded slice segment NAL units of the picture or access unit.

If a picture has nal_unit_type equal to CL_RAS_NV, TRAIL_N, TSA_N, STSA_N, RADL_N, RASL_N, RSV_VCL_N10, RSV_VCL_N12, or RSV_VCL_N14, the picture is a sub-layer non-reference picture. Otherwise, the picture is a sub-layer reference picture.

It is a requirement of bitstream conformance that a CL-RAS picture that belongs to an IRAP AU shall be a sub-layer reference picture.

Each picture, other than the first picture in the bitstream in decoding order, is considered to be associated with the previous IRAP picture in decoding order.

When a picture is a leading picture, it shall be a RADL or RASL picture.

When a picture is a trailing picture, it shall not be a RADL or RASL picture.

When a picture is a leading picture, it shall precede, in decoding order, all trailing pictures that are associated with the same IRAP picture.

No RASL pictures shall be present in the bitstream that are associated with a BLA picture having nal_unit_type equal to BLA_W_RADL or BLA_N_LP.

No RASL pictures shall be present in the bitstream that are associated with an IDR picture.

No RADL pictures shall be present in the bitstream that are associated with a BLA picture having nal_unit_type equal to BLA_N_LP or that are associated with an IDR picture having nal_unit_type equal to IDR_N_LP.

NOTE 7—It is possible to perform random access at the position of an IRAP access unit by discarding all access units before the IRAP access unit (and to correctly decode the IRAP picture and all the subsequent non-RASL pictures in decoding order), provided each parameter set is available (either in the bitstream or by external means not specified in this Specification) when it needs to be activated.

Any picture that has PicOutputFlag equal to 1 that precedes an IRAP picture in decoding order shall precede the IRAP picture in output order and shall precede any RADL picture associated with the IRAP picture in output order.

Any RASL picture associated with a CRA or BLA picture shall precede any RADL picture associated with the CRA or BLA picture in output order.

Any RASL picture associated with a CRA picture shall follow, in output order, any IRAP picture that precedes the CRA picture in decoding order.

When sps_temporal_id_nesting_flag is equal to 1 and TemporalId is greater than 0, the nal_unit_type shall be equal to TSA_R, TSA_N, RADL_R, RADL_N, RASL_R, or RASL_N.

nuh_layer_id shall be equal to 0. Other values of nuh_layer_id may be specified in the future by ITU-T|ISO/IEC. For purposes other than determining the amount of data in the decoding units of the bitstream (as specified in Annex C), decoders shall ignore (i.e. remove from the bitstream and discard) all NAL units with values of nuh_layer_id not equal to 0.

NOTE 8—It is anticipated that in future scalable or 3D video coding extensions of this specification, this syntax element will be used to identify additional layers that may be present in the CVS, wherein a layer may be, e.g. a spatial scalable layer, a quality scalable layer, a texture view or a depth view.

If nal_unit_type is equal to CL_RAS_R or CL_RAS_N, i.e. the coded slice segment belongs to a CL_RAS picture, the value of nuh_layer_id shall be greater than zero.

Alternatively, if nal_unit_type is equal to CL_RAS_R or CL_RAS_N, i.e. the coded slice segment belongs to an clean-random access skip picture, the value of nuh_layer_id shall be restricted as follows:

if the current AU is an IRAP AU, nuh_layer_id shall be greater than the access layer ID of the current AU else, the value of nuh_layer_id shall be greater than the access layer ID of the preceding IRAP AU in decoding order.

nuh_temporal_id_plus1 minus 1 specifies a temporal identifier for the NAL unit. The value of nuh_temporal_id_plus1 shall not be equal to 0.

The variable TemporalId is specified as follows:

$$TemporalId = nuh\_temporal\_id\_plus1 - 1 \quad (7\text{-}1)$$

If nal_unit_type is in the range of BLA_W_LP to RSV_I-RAP_VCL23, inclusive, i.e. the coded slice segment belongs to an IRAP picture, TemporalId shall be equal to 0. Otherwise, when nal_unit_type is equal to TSA_R, TSA_N, STSA_R, or STSA_N, TemporalId shall not be equal to 0.

The value of TemporalId shall be the same for all VCL NAL units of an access unit. The value of TemporalId of an access unit is the value of the TemporalId of the VCL NAL units of the access unit.

The value of TemporalId for non-VCL NAL units is constrained as follows:

If nal_unit_type is equal to VPS_NUT or SPS_NUT, TemporalId shall be equal to 0 and the TemporalId of the access unit containing the NAL unit shall be equal to 0.

Otherwise if nal_unit_type is equal to EOS_NUT or EOB_NUT, TemporalId shall be equal to 0.

Otherwise, if nal_unit_type is equal to AUD_NUT or FD_NUT, TemporalId shall be equal to the TemporalId of the access unit containing the NAL unit.

Otherwise, TemporalId shall be greater than or equal to the TemporalId of the access unit containing the NAL unit.

NOTE 9—When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all PPSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information, e.g. in a buffering period SEI message or a picture timing SEI message, that applies to a bitstream subset that includes access units for which the TemporalId values are greater than the TemporalId of the access unit containing the SEI NAL unit.

The general decoding process are discussed below.

The decoding process is the similar as that described in example 1, where the changes made in the decoding process for ELDISC pictures with NoELDiscPicDecodeFlag equal to 1 are applied to CL-RAS pictures.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or twoway video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC has developed the HEVC standard. The HEVC standardization efforts were based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree"

(RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may form a bitstream including multiple layers of video data. For example, the bitstream may include a base layer and one or more enhancement layers in accordance with a scalable extension to a video coding standard, such as the scalable extension to HEVC (SHVC). Additionally or alternatively, the bitstream may include multiple views, e.g., a base view and one or more dependent views. For instance, the bitstream may conform to a multi-view extension to HEVC (MV-HEVC) or a three-dimensional extension to HEVC (3D-HEVC). In this disclosure, a view is considered one type of layer. Thus, references to multi-layer video data include multi-view video data.

In accordance with the techniques of this disclosure, video encoder 20 may form data for the bitstream such that different layers have different frequencies of IRAP pictures. For example, video encoder 20 may provide an IRAP picture for a base layer for every two seconds of playback time, for a first enhancement layer every five seconds of playback time, and for a second enhancement layer every ten seconds of playback time. In this example, destination device 14 can begin random access to retrieve data at least of the base layer at playback intervals of two seconds. In other words, in this example, destination device 14 may experience a maximum tune-in delay of two seconds. Typically, users find at least some video data, even if relatively low quality, to be more desirable than a blank screen. By providing a bitstream with varying frequencies for random access points in different layers, video encoder 20 may allow destination device 14 to reduce tune-in delay while also reducing a bitrate for the bitstream across the various video coding layers.

As discussed above, an access unit includes data for all pictures to be played at a particular output time. For instance, according to the example described above, an access unit may include a picture for the base layer, a picture for the first enhancement layer, and a picture for the second enhancement layer. Video decoder 30 may use the pictures of the enhancement layer to improve the quality of the base layer picture. For example, the pictures in the enhancement layers may include data for improving one or more of a spatial resolution, signal-to-noise ratio (SNR) quality, chroma bit depth, different camera perspectives (e.g., for multi-view video data), or the like.

Video encoder 20 may encode pictures in the enhancement layer(s) using intra-prediction, inter-layer prediction, and/or temporal inter-prediction. In order for a picture that is predicted using temporal inter-prediction to be decodable, reference pictures from which the picture depends must be available (e.g., previously decoded). In some cases, such reference pictures are not available, e.g., due to transmission errors. Accordingly, video decoder 30 may be configured to perform a non-existing picture process when attempting to decode a picture for which one or more reference pictures are not available.

This disclosure recognizes that, when random access is performed starting with a partially aligned IRAP access unit, the non-IRAP pictures of the partially aligned IRAP access unit and/or subsequent pictures of video coding layers including the non-IRAP pictures of the access unit may not be decodable. Thus, in accordance with the techniques of this disclosure, video encoder 20 may signal data that indicates pictures of a coded video sequence, which starts with a partially aligned IRAP access unit, that are not correctly decodable. In this manner, video decoder 30 can use the signaled data indicating that a picture is not correctly decodable to skip decoding of the picture (when random access is performed starting with the corresponding partially aligned IRAP access unit). Thus, video decoder 30 need not attempt to decode the picture and perform the non-existing picture process, but instead, may skip any attempt at decoding the picture and simply parse data for the picture. Alternatively, video decoder 30 may determine to perform the non-existing picture process, e.g., based on this signaled data.

In this manner, the techniques of this disclosure support partially aligned IRAP access units, which may provide benefits in terms of reduced tune-in delay for random access and reduced bitrate for enhancement layers (which may include dependent views). Likewise, the techniques of this disclosure may also provide benefits for video decoders, such as video decoder 30, because video decoder 30 can easily skip non-decodable pictures when random access is performed from a partially aligned IRAP access unit.

Figure 2:
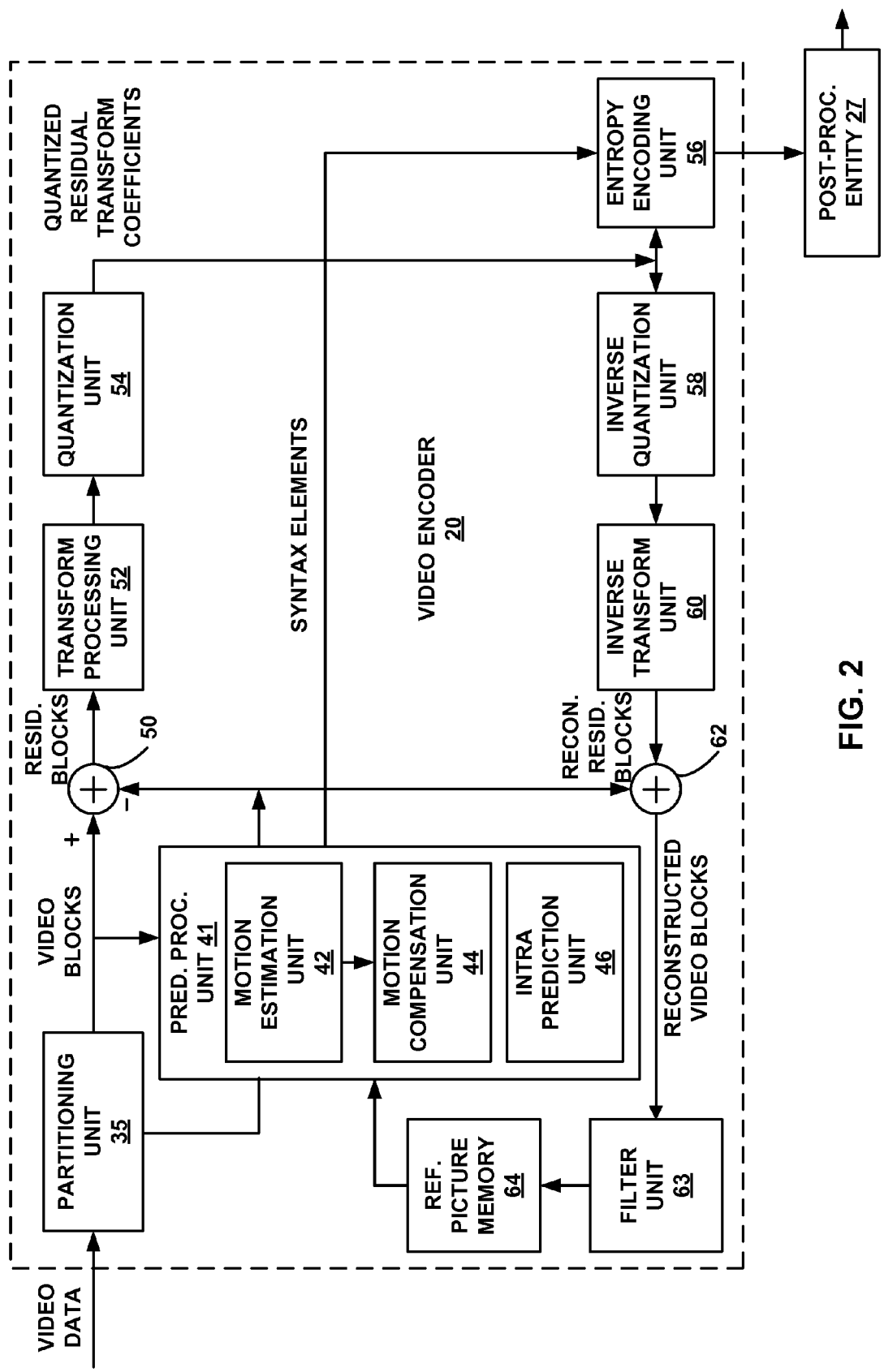
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may be configured to output video to post processing entity 27. Post processing entity 27 is intended to represent an example of a video entity, such as a media aware network element (MANE) or splicing/editing device, that may process encoded video data from video encoder 20. In some instances, post processing entity may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra prediction unit 46. For video block reconstruction, video encoder 20 also includes inverse quantization unit 58, inverse transform unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 may determine to encode an intra random access picture (IRAP) of a base video coding layer (e.g., a base view). Accordingly, prediction processing unit 41 may be configured to cause intra prediction unit 46 to predict blocks of the IRAP picture using intra prediction. The IRAP picture may be, for example, an IDR picture, a CRA picture, or a BLA picture. Video encoder 20 may further determine to encode a picture for an enhancement layer (e.g., a non-base view) of an access unit including the IRAP picture of the base layer as a non-IRAP picture. Thus, prediction processing unit 41 may determine whether to predict blocks of the non-IRAP picture using inter-prediction (e.g., temporal inter-prediction and/or inter-layer prediction) using motion estimation unit 42 and motion compensation unit 44, and/or using intra-prediction, performed by intra prediction unit 46.

When video encoder 20 determines to encode a picture of an access unit as a non-IRAP picture, where the access unit also includes at least one IRAP picture, video encoder 20 may further encode a value for a syntax element that indicates that the picture coded as the non-IRAP picture is not correctly decodable when random access is performed starting with the access unit. In this situation, the access unit represents a partially aligned IRAP access unit. For example, video encoder 20 may assign a particular value for network abstraction layer (NAL) units that encapsulate slices of the non-IRAP picture, e.g., values of 24 or 25, as shown in the example of Table 7-1 above. Additionally or alternatively, video encoder 20 may encode a value for a flag that indicates that, when random access begins with the partially aligned IRAP access unit, the non-IRAP pictures of the access unit are not correctly decodable. Furthermore, video encoder 20 may encode, additionally or alternatively, data for other pictures of other access units in the same coded video sequence that indicates whether these pictures are decodable when random access is performed starting with the partially aligned IRAP access unit.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 represents an example of a video encoder configured to encode an intra random access point (IRAP) picture of a partially aligned IRAP access unit of the video data, and encode data that indicates, when performing random access from the partially aligned IRAP access unit, at least one picture of a video coding layer that is not correctly decodable.

Figure 3:
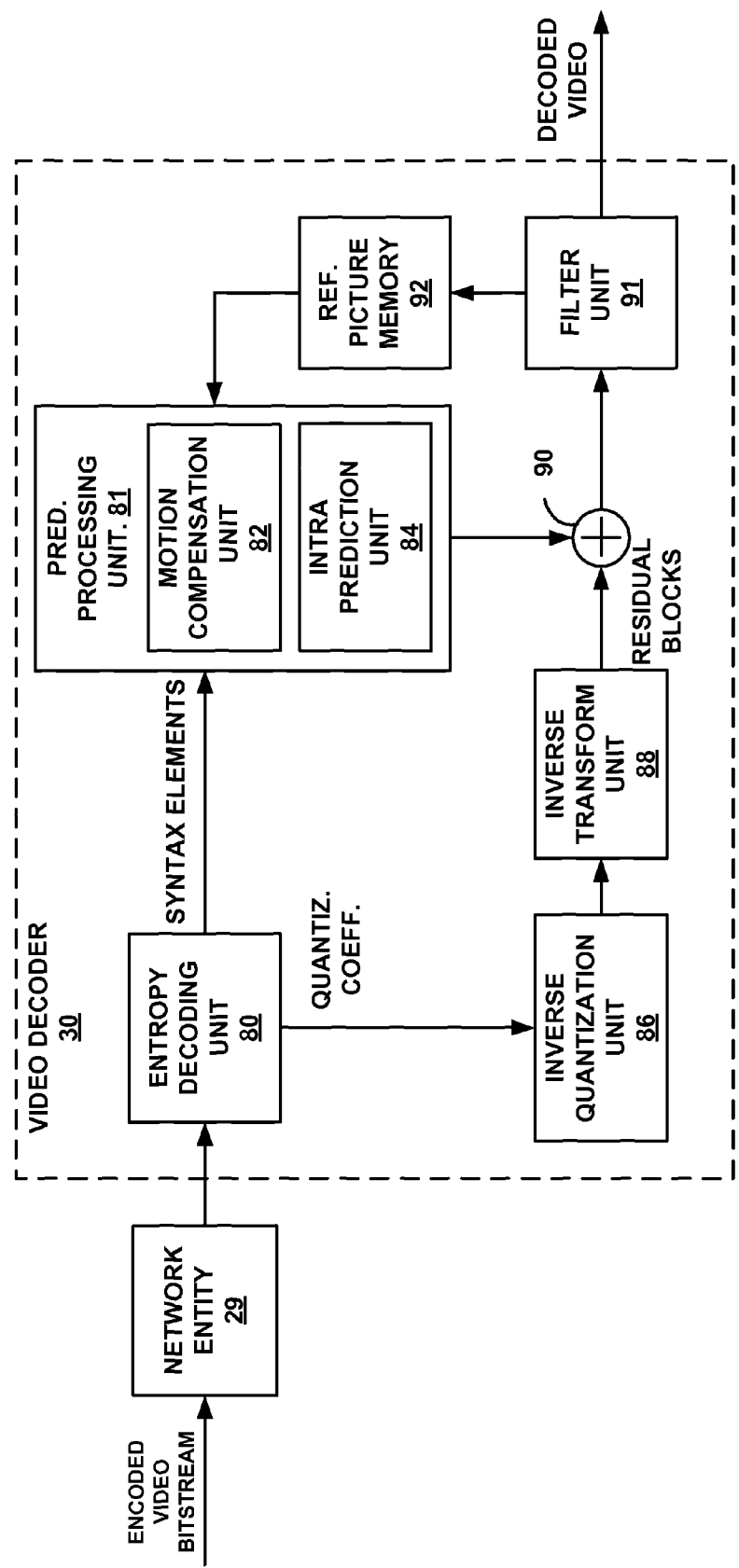
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, prediction processing unit 81, inverse quantization unit 86, inverse transformation unit 88, summer 90, filter unit 91, and reference picture memory 92. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 2.

During the decoding process, video decoder 30 receives data of an encoded video bitstream that represents video blocks of an encoded video slice and associated syntax elements from video encoder 20. Video decoder 30 may receive the encoded video bitstream from network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

In accordance with the techniques of this disclosure, video decoder 30 may receive syntax data (e.g., a flag or a NAL unit value) indicating whether data of a picture is decodable when performing random access from a partially aligned IRAP access unit of a coded video sequence including the picture. Video decoder 30 may further determine whether random access was performed from the corresponding partially aligned IRAP access unit. When video decoder 30 determines that random access was performed from the partially aligned IRAP access unit, video decoder 30 may skip decoding of pictures that are indicated to not be decodable. Video decoder 30 may determine that random access is performed from the partially aligned IRAP access unit when the partially aligned IRAP access unit is the ordinal-first access unit of the bitstream to be decoded, and/or when one or more reference pictures for non-IRAP pictures of the partially aligned IRAP access unit are not present in a decoded picture buffer, e.g., of reference picture memory 92.

In some examples, video decoder 30 may determine whether a picture is decodable based on a NAL unit type for NAL units that encapsulate slices of the picture. As discussed above with respect to Table 7-1, a NAL unit type value of 24 or 25 may indicate that a picture is a discardable enhancement layer picture (e.g., an ELDISC picture), which is not correctly decodable when random access is performed from a partially aligned IRAP access unit of a coded video sequence including the picture.

Video decoder 30 may simply parse data for pictures that are indicated to not be decodable, rather than attempting to decode the data for such pictures. When skipping decoding of such a picture, video decoder 30 may avoid passing syntax elements for PUs and/or TUs of blocks of the picture (e.g., intra prediction syntax, inter prediction syntax elements, transform coefficient syntax elements, and the like) to prediction processing unit 81, inverse quantization unit 86, and inverse transform unit 88. Instead, video decoder 30 may simply parse and discard the data, until reaching a picture that can be decoded.

An applicable video coding standard or extension, such as SHVC, MV-HEVC, or 3D-HEVC, may specify that a bitstream starting with a partially aligned IRAP access unit is a conforming bitstream. Thus, video decoder 30 may be configured to parse such a bitstream according to the standard or extension to the standard. For example, video decoder 30 may parse the bitstream according to a contextfree grammar or other such grammar that corresponds to the applicable video coding standard or extension.

Rather than skipping decoding of these pictures, video decoder 30 may be configured to perform a non-existent picture process for pictures that are signaled to be not correctly decodable when performing random access from a partially aligned IRAP access unit. For example, video decoder 30 may identify a first set of pictures in the IRAP access unit that are not correctly decodable (e.g., based on the signaled data). For each picture in the first set of pictures, based on reference picture sets for the pictures, video decoder 30 may generate respective second sets of unavailable reference pictures. That is, the pictures of the partially aligned IRAP access unit may be not correctly decodable because reference pictures on which these pictures depend were not received. Thus, video decoder 30 may generate the reference pictures according to the non-existent pictures process. Video decoder 30 may further mark the pictures of the second set of pictures (that is, the generated reference pictures) as either short-term or long-term reference pictures, as indicated in the respective reference picture set. Video decoder 30 may then decode each picture in the first set of pictures using the generated reference pictures. It should be understood that this decoding of these pictures may not accurately reproduce the pictures.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 represents an example of a video decoder configured to decode an intra random access point (IRAP) picture of a partially aligned IRAP access unit of the video data, and decode data that indicates, when performing random access from the partially aligned IRAP access unit, at least one picture of a video coding layer that is not correctly decodable.

Figure 4:
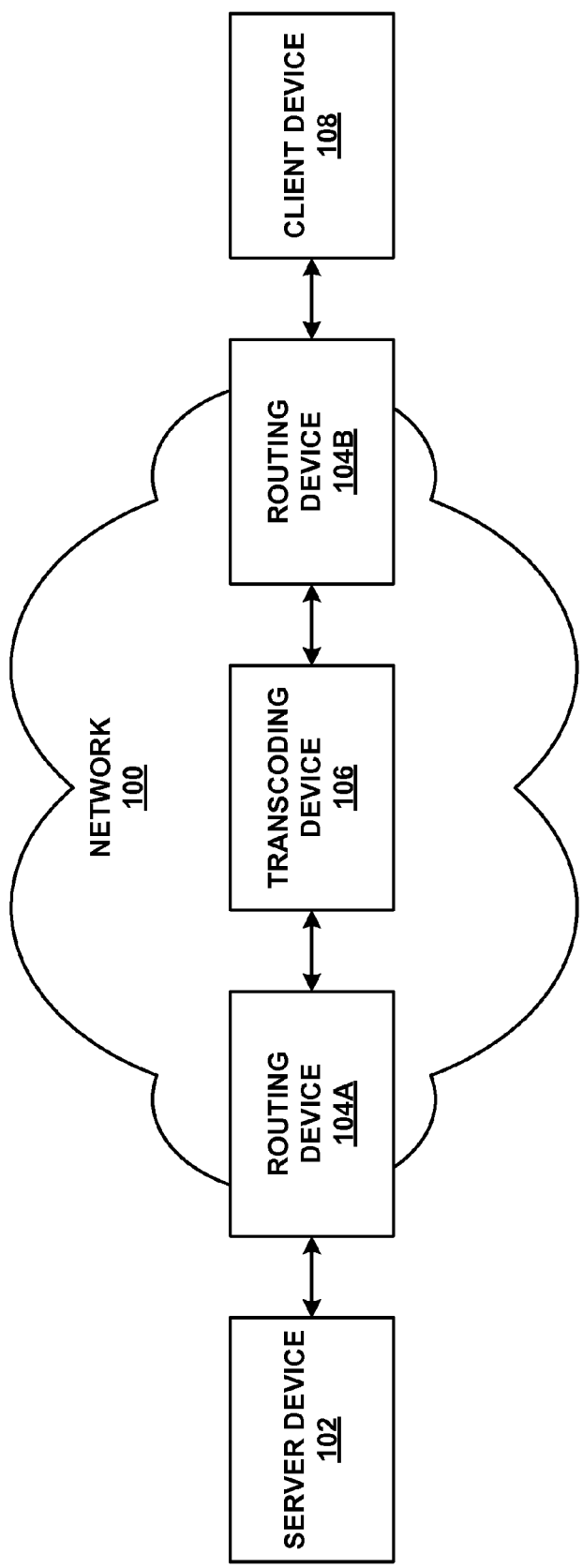
FIG. 4 is a block diagram illustrating an example set of devices that form part of a network for communication of video data.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder 20 illustrated in FIG. 2 and decoder 30 illustrated in FIG. 3 are also exemplary devices that can be configured to perform the techniques of this disclosure.

For examples, server device 102 may include a video encoder to encode a picture or pictures that are after a random access point or stream adaptation point, such as a temporal layer switching point, or other stream adaptation point. For example, this point could be a switching point for adaptation of bit rate, frame rate (i.e., temporal layer switching point), or spatial resolution Similarly, client device 108 may decode a picture or pictures that are after a random access point or stream adaptation point, such as a temporal layer switching point.

Transcoding device 106 may be configured to perform bitstream splicing. That is, transcoding device 106 may receive data for two different bitstreams, and to join data from one of the bitstreams with data of another of the bitstreams, e.g., at a random access point. FIG. 6, as discussed below, illustrates an example of a spliced bitstream. The point at which the two bitstreams are spliced together may comprise a partially aligned IRAP access unit.

Furthermore, the techniques of this disclosure may be applicable to such a spliced bitstream. That is, server device 102, transcoding device 106, or another device may signal data indicating pictures that are not correctly decodable when random access occurs at a partially aligned IRAP access unit. As a result of the splicing, the data of the bitstream following the splice point may be considered to be randomly accessed.

In some examples, transcoding device 106 may remove the non-decodable pictures from the spliced bitstream. In other examples, client device 108 (that is, a video decoder of client device 108) may parse, without decoding, pictures following the partially aligned IRAP access unit (which acts as the splice point) that are indicated to not be decodable when random access occurs starting at the partially aligned IRAP access unit. Although the spliced bitstream would include data preceding the splice point, the partially aligned IRAP access unit that acts as the splice point may be considered to be randomly accessed for purposes of the techniques of this disclosure.

FIG. 5 is a conceptual diagram that illustrates various examples of access units. In the example of FIG. 5, an aligned IRAP access unit is considered to be an IRAP access unit including only IRAP pictures. In this example, a partially aligned IRAP access unit is considered to include IRAP pictures up to a particular layer, and non-IRAP access units after that layer (in layer decoding order). Other access units, e.g., those in which there is a non-IRAP picture in a layer below a layer that includes an IRAP picture, are not considered to be IRAP access units, in this example.

FIG. 6 is a conceptual diagram that illustrates bitstream splicing. In this example, a spliced bitstream includes pictures from a first bitstream 110 and pictures from a second bitstream 114, separated by splice point 112. Within this spliced bitstream, following splice point 112, the pictures from second bitstream 114 begin with partially aligned IRAP access unit 116. In this example, partially aligned IRAP access unit 116 includes three IRAP pictures and two non-IRAP pictures. The two non-IRAP pictures are treated as discardable enhancement layer pictures, because they are not correctly decodable. Accordingly, a video encoder (e.g., video encoder 20) may encode data indicating that, when random access is performed starting with partially aligned IRAP access unit 116, these pictures are not correctly decodable. Again, it should be understood that although the video decoder may receive the pictures of first bitstream 110, the pictures of second bitstream 114 are considered to be randomly accessed, because the pictures of first bitstream 110 do not include reference pictures for the pictures of second bitstream 114.

In the example of FIG. 6, non-decodable pictures (e.g., discardable enhancement layer pictures) are shaded in grey. Thus, each of the pictures, shaded grey in FIG. 6, in the video coding layers that contain non-IRAP pictures of partially aligned IRAP access unit 116 that succeed, in decoding order, access unit 116 and precede, in decoding order, the next IRAP picture in the layer containing the picture are not correctly decodable when random access is performed starting at the partially aligned IRAP access unit. In accordance with the techniques of this disclosure, a video coder (e.g., video encoder 20 or video decoder 30) may code (encode or decode) data indicating that these pictures are not correctly decodable when random access is performed starting with partially aligned IRAP access unit 116.

FIG. 6 further illustrates IRAP picture 118 and IRAP picture 120 in the video coding layers including non-IRAP pictures of partially aligned IRAP access unit 116. Thus, data for IRAP pictures 118, 120 and pictures following IRAP pictures 118, 120, in the respective video coding layers, may indicate that these pictures are decodable.

Figure 7:
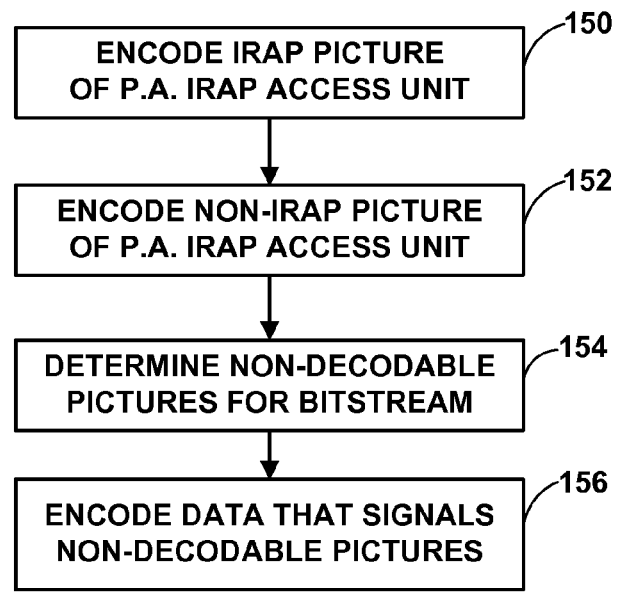
FIG. 7 is a flowchart illustrating an example method for encoding video data in accordance with the techniques of this disclosure.

FIG. 7 is a flowchart illustrating an example method for encoding video data in accordance with the techniques of this disclosure. The example of FIG. 7 is described with respect to video encoder 20. However, it should be understood that other video encoding devices may be configured to perform the method of FIG. 7, or similar methods.

In this example, video encoder 20 encodes an IRAP picture of a partially aligned (P.A.) IRAP access unit (150). The IRAP picture may correspond to a base layer IRAP picture. Although not shown in FIG. 7, video encoder 20 may also encode all other pictures of the layer including the IRAP picture, e.g., the base layer (or a lower-layer picture). Video encoder 20 may then encode a non-IRAP picture of the same partially aligned IRAP access unit (152). The non-IRAP picture may correspond to a picture of an enhancement layer (e.g., a layer above the layer including the IRAP picture).

Video encoder 20 may determine non-decodable pictures for a bitstream including the partially aligned access unit (154). Such non-decodable pictures may include the non-IRAP picture of the partially aligned IRAP access unit and subsequent pictures (in coding order) of the same video coding layer as that including the non-IRAP picture, within the same coded video sequence. Video encoder 20 may then encode data that signals that these pictures are non-decodable pictures when random access is performed starting from the partially aligned IRAP access unit (156). For example, video encoder 20 may encode values for NAL unit types of NAL units that encapsulate slices of the pictures that indicate that these pictures are not correctly decodable when random access is performed starting from the partially aligned IRAP access unit.

In this manner, the method of FIG. 7 represents an example of a method including encoding an intra random access point (IRAP) picture of a partially aligned IRAP access unit and encoding data that indicates, when performing random access from a partially aligned intra random access point (IRAP) access unit, at least one picture of a video coding layer that is not correctly decodable.

Figure 8:
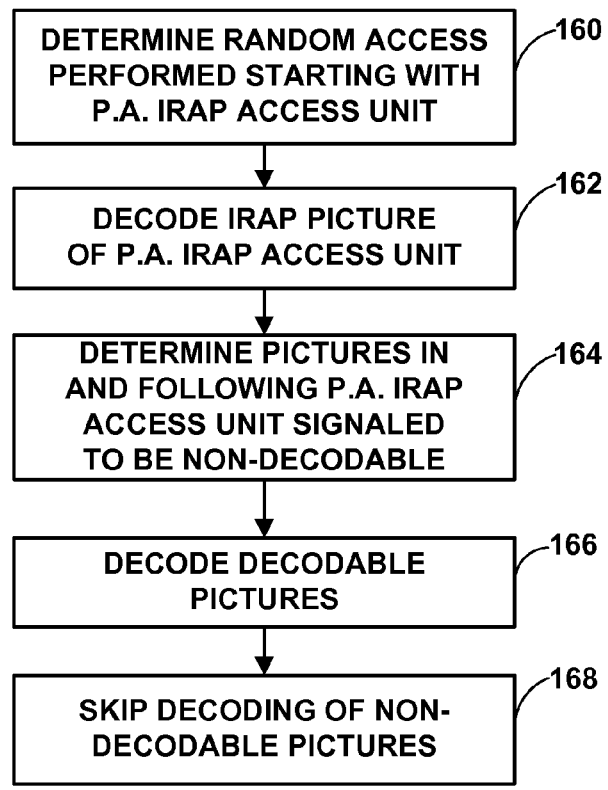
FIG. 8 is a flowchart illustrating an example method for decoding video data in accordance with the techniques of this disclosure.

FIG. 8 is a flowchart illustrating an example method for decoding video data in accordance with the techniques of this disclosure. In this example, the method of FIG. 8 is described as being performed by video decoder 30. However, it should be understood that other video decoding devices may also perform this or a similar method.

Initially, video decoder 30 may determine that random access has been performed starting with a partially aligned (P.A.) IRAP access unit (160). For example, video decoder 30 may determine reference pictures to be included in reference picture lists for one or more non-IRAP pictures in the partially aligned IRAP access unit, and determine whether these pictures are present in a decoded picture buffer. A sequence parameter set (SPS), picture parameter set (PPS), or a slice segment header for the non-IRAP pictures of the partially aligned IRAP access unit may indicate these reference pictures. If the reference pictures are not present in the decoded picture buffer, video decoder 30 may determine that random access has been performed starting with the partially aligned IRAP access unit. Alternatively, a device, unit, or module external to video decoder 30 may indicate that random access has been performed, starting with the partially aligned IRAP access unit.

In any case, video decoder 30 may then decode an IRAP picture of the partially aligned IRAP access unit (162). Video decoder 30 may then determine pictures in and following the partially aligned IRAP access unit that are signaled to be non-decodable when random access is performed starting with the partially aligned IRAP access unit (164). For example, video decoder 30 may determine that a picture is not correctly decodable based on NAL unit types for NAL units that encapsulate slices of the picture. Based on this data, video decoder 30 may decode the decodable pictures (166) and skip decoding of non-decodable pictures (168).

In this manner, the method of FIG. 8 represents an example of a method including decoding data that indicates, when performing random access from a partially aligned intra random access point (IRAP) access unit, at least one picture of a video coding layer that is not correctly decodable, decoding an IRAP picture of the IRAP access unit, and based on the data, skipping decoding of the picture that the data indicates is not correctly decodable.

The method of FIG. 8 represents one example method. In another example, a method may include decoding data that indicates, when performing random access from a partially aligned intra random access point (IRAP) access unit, at least one picture of a video coding layer that is not correctly decodable, decoding an IRAP picture of the IRAP access unit, based on the data that indicates the at least one picture that is not correctly decodable, identifying a first set of pictures in the IRAP access unit that are not correctly decodable, for each picture in the first set of pictures, based on reference picture sets for the pictures, generating respective second sets of unavailable reference pictures, marking pictures of the second set of pictures as either short-term or long-term reference pictures as indicated in the respective reference picture set, and decoding each picture in the first set of pictures.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of decoding video data, the method comprising:
   decoding data that indicates, when performing random access from a partially aligned intra random access point (IRAP) access unit, at least one picture of a video coding layer that is not correctly decodable;
   decoding an IRAP picture of the IRAP access unit; and
   decoding video data based on the data that indicates the at least one picture that is not correctly decodable and based on the IRAP picture, comprising:
      identifying a first set of one or more pictures in the IRAP access unit that the data indicates are not correctly decodable;
      for each picture in the first set of pictures, based on reference picture sets for the pictures in the first set of pictures, generating respective second sets of unavailable reference pictures;
      marking the reference pictures of the second sets of reference pictures as either short-term or long-term reference pictures as indicated in the respective reference picture set; and
      decoding each picture in the first set of pictures.

2. The method of claim 1, wherein decoding the video data comprises skipping decoding of a picture, separate from the first set of pictures, that the data indicates is not correctly decodable.

3. The method of claim 1, wherein decoding the data comprises:
   decoding a network abstraction layer (NAL) unit type value for a NAL unit including data of the picture; and
   determining that the NAL unit type value indicates that the NAL unit includes data that is not correctly decodable when random access is performed from the partially aligned IRAP access unit.

4. The method of claim 3, wherein the NAL unit type value comprises a value of 24 or 25.

5. The method of claim 1, wherein the data indicates that the picture is an enhancement layer picture that is not necessarily correctly decodable when decoding starts from the partially aligned IRAP access unit.

6. The method of claim 1, wherein the video coding layer comprises an enhancement layer, and wherein the IRAP picture is in a base layer.

7. The method of claim 1, wherein performing random access from the partially aligned IRAP access unit comprises starting decoding of a bitstream including the partially aligned IRAP access unit at the partially aligned IRAP access unit.

8. The method of claim 1, wherein the partially aligned IRAP access unit includes a non-IRAP picture in the video coding layer that includes the picture that is not correctly decodable and the IRAP picture in a different video coding layer.

9. The method of claim 8, wherein the IRAP picture comprises one of an instantaneous decoding refresh (IDR) picture, a clean random access (CRA) picture, or a broken link access (BLA) picture.

10. The method of claim 8, wherein the picture that the data indicates is not correctly decodable comprises the non-IRAP picture of the partially aligned IRAP access unit.

11. The method of claim 1, further comprising skipping decoding of a non-IRAP picture of the partially aligned access unit, wherein the non-IRAP picture is separate from the first set of pictures, and wherein the non-IRAP picture is in the video coding layer that includes the picture that the data indicates is not correctly decodable.

12. The method of claim 1, further comprising skipping decoding of all pictures, other than the pictures in the first set of pictures, in the video coding layer that includes the picture that is not correctly decodable until an access unit including an IRAP picture of the video coding layer has been received.

13. The method of claim 1, further comprising decoding data including one or more indications of one or more layer components of the video coding layer that are not correctly decodable when random access is performed from the partially aligned IRAP access unit.

14. The method of claim 1, further comprising decoding data for one or more layer components of non-base layers indicative of whether the corresponding layer component is decodable when performing splicing from the IRAP access unit.

15. The method of claim 2, wherein skipping decoding of the picture comprises parsing data for the picture separate from the first set of pictures without decoding the parsed data for the picture.

16. The method of claim 15, wherein parsing comprises parsing the data for the picture based on requirements of an applicable video coding standard for a conforming bitstream.

17. A device for decoding video data, the device comprising:
   a memory storing video data; and
   a video decoder configured to:
      decode an intra random access point (IRAP) picture of a partially aligned IRAP access unit of the video data,
      decode data that indicates, when performing random access from the partially aligned IRAP access unit, at least one picture of a video coding layer that is not correctly decodable,
      identify a first set of one or more pictures in the IRAP access unit that the data indicates are not correctly decodable,
      for each picture in the first set of pictures, based on reference picture sets for the pictures, generate respective second sets of unavailable reference pictures,
      mark the reference pictures of the second set of reference pictures as either short-term or long-term reference pictures as indicated in the respective reference picture set, and
      decode each picture in the first set of pictures.

18. The device of claim 17, wherein the video decoder is configured to skip decoding of a picture, separate from the first set of pictures, based on the data when random access is performed starting from the partially aligned IRAP access unit.

19. The device of claim 18, wherein the video decoder is configured to skip decoding of a non-IRAP picture, separate from the first set of pictures, of the partially aligned access unit, wherein the non-IRAP picture is in the video coding layer that includes the picture that the data indicates is not correctly decodable.

20. The device of claim 18, wherein the video decoder is configured to skip decoding of all pictures, other than the pictures of the first set of pictures, in the video coding layer that includes the picture that is not correctly decodable until an access unit including an IRAP picture of the video coding layer has been received.

21. The device of claim 18, wherein to skip decoding of the picture, the video decoder is configured to parse data for the picture without decoding the parsed data for the picture.

22. The device of claim 17, wherein the data indicates that the picture comprises an enhancement layer picture that is not necessarily correctly decodable when decoding starts from the partially aligned IRAP access unit.

23. The device of claim 17, wherein the partially aligned IRAP access unit includes a non-IRAP picture in the video coding layer that includes the picture that is not correctly decodable and the IRAP picture in a different video coding layer.

24. The device of claim 23, wherein the picture that the data indicates is not correctly decodable comprises the non-IRAP picture of the partially aligned IRAP access unit.

25. The device of claim 17, wherein the device comprises at least one of:
an integrated circuit;
a microprocessor; and
a wireless communication device.

26. A device for decoding video data, the device comprising:
means for decoding an intra random access point (IRAP) picture of a partially aligned IRAP access unit of the video data;
means for decoding data that indicates, when performing random access from the partially aligned IRAP access unit, at least one picture of a video coding layer that is not correctly decodable;
means for identifying a first set of one or more pictures in the IRAP access unit that the data indicates are not correctly decodable;
means for generating, for each picture in the first set of pictures, based on reference picture sets for the pictures, respective second sets of unavailable reference pictures;
means for marking the reference pictures of the second set of reference pictures as either short-term or long-term reference pictures as indicated in the respective reference picture set; and
means for decoding each picture in the first set of pictures.

27. The device of claim 26, wherein the means for coding the IRAP picture comprise means for decoding the IRAP picture, further comprising means for skipping decoding of a picture, separate from the first set of pictures, based on the data when random access is performed starting from the partially aligned IRAP access unit.

28. The device of claim 27, further comprising means for skipping decoding of a non-IRAP picture, separate from the first set of pictures, of the partially aligned access unit, wherein the non-IRAP picture is in the video coding layer that includes the picture that the data indicates is not correctly decodable.

29. The device of claim 27, further comprising means for skipping decoding of all pictures, other than the pictures of the first set of pictures, in the video coding layer that includes the picture that is not correctly decodable until an access unit including an IRAP picture of the video coding layer has been received.

30. The device of claim 27, wherein the means for skipping comprises means for parsing data for the picture without decoding the parsed data for the picture.

31. The device of claim 26, wherein the data indicates that the picture comprises an enhancement layer picture that is not necessarily correctly decodable when decoding starts from the partially aligned IRAP access unit.

32. The device of claim 26, wherein the partially aligned IRAP access unit includes a non-IRAP picture in the video coding layer that includes the picture that is not correctly decodable and the IRAP picture in a different video coding layer.

33. The device of claim 32, wherein the picture that the data indicates is not correctly decodable comprises the non-IRAP picture of the partially aligned IRAP access unit.

34. A non-transitory computer-readable storage medium having stored thereon instructions that, when executed, cause a processor of a device for coding video data to:
decode an intra random access point (IRAP) picture of a partially aligned IRAP access unit of the video data;
decode data that indicates, when performing random access from the partially aligned IRAP access unit, at least one picture of a video coding layer that is not correctly decodable;
identify a first set of one or more pictures in the IRAP access unit that the data indicates are not correctly decodable;
for each picture in the first set of pictures, based on reference picture sets for the pictures, generate respective second sets of unavailable reference pictures;
mark the reference pictures of the second set of reference pictures as either short-term or long-term reference pictures as indicated in the respective reference picture set; and
decode each picture in the first set of pictures.

35. The non-transitory computer-readable storage medium of claim 34, wherein the instructions that cause the processor to code the IRAP picture comprise instructions that cause the processor to decode the IRAP picture, further comprising instructions that cause the processor to skip decoding of a picture, separate from the first set of pictures, based on the data when random access is performed starting from the partially aligned IRAP access unit.

36. The non-transitory computer-readable storage medium of claim 35, further comprising instructions that cause the processor to skip decoding of a non-IRAP picture, separate from the first set of pictures, of the partially aligned access unit, wherein the non-IRAP picture is in the video coding layer that includes the picture that the data indicates is not correctly decodable.

37. The non-transitory computer-readable storage medium of claim 35, further comprising instructions that cause the processor to skip decoding of all pictures, other than pictures of the first set of pictures, in the video coding layer that includes the picture that is not correctly decodable until an access unit including an IRAP picture of the video coding layer has been received.

38. The non-transitory computer-readable storage medium of claim 35, wherein the instructions that cause the processor to skip decoding of the picture comprise instructions that cause the processor to parse data for the picture without decoding the parsed data for the picture.

39. The non-transitory computer-readable storage medium of claim 34, wherein the data indicates that the picture comprises an enhancement layer picture that is not necessarily correctly decodable when decoding starts from the partially aligned IRAP access unit.

40. The non-transitory computer-readable storage medium of claim 34, wherein the partially aligned IRAP access unit includes a non-IRAP picture in the video coding layer that includes the picture that is not correctly decodable and the IRAP picture in a different video coding layer.

41. The non-transitory computer-readable storage medium of claim 40, wherein the picture that the data indicates is not correctly decodable comprises the non-IRAP picture of the partially aligned IRAP access unit.

* * * * *